(12) United States Patent
Luby

(10) Patent No.: US 11,972,483 B2
(45) Date of Patent: *Apr. 30, 2024

(54) SYSTEMS AND METHODS INVOLVING A HUB PLATFORM AND COMMUNICATION NETWORK CONFIGURED FOR PROCESSING DATA INVOLVING TIME-STAMPED/TIME-SENSITIVE ASPECTS AND/OR OTHER FEATURES

(71) Applicant: ClearingBid, Inc., Burlingame, CA (US)

(72) Inventor: Thomas Luby, Morristown, NJ (US)

(73) Assignee: ClearingBid, Inc., Burlingame, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/080,662

(22) Filed: Dec. 13, 2022

(65) Prior Publication Data
US 2023/0186389 A1 Jun. 15, 2023

Related U.S. Application Data

(63) Continuation of application No. 17/544,890, filed on Dec. 7, 2021, now Pat. No. 11,694,262, which is a
(Continued)

(51) Int. Cl.
*G06Q 40/04* (2012.01)
*G06F 40/00* (2020.01)

(52) U.S. Cl.
CPC ............ *G06Q 40/04* (2013.01); *G06F 40/00* (2020.01)

(58) Field of Classification Search
USPC ........................................................ 705/36
See application file for complete search history.

(56) References Cited

U.S. PATENT DOCUMENTS 7,346,568 B1 3/2008 Cadoux
7,415,436 B1 8/2008 Evelyn et al.
(Continued)

OTHER PUBLICATIONS

J Christopher Westland; Theordore H. Clark, "Electronic Auctions and Intermediaries," in Global Electronic Commerce: Theory and Case Studies , MIT Press, 1999, pp. 343-383. (Auctions) (Year: 1999).*
(Continued)

*Primary Examiner* — Chikaodinaka Ojiaku
(74) *Attorney, Agent, or Firm* — Greenberg Traurig, LLP

(57) ABSTRACT

Systems involving a hub platform and communication network configured for processing data involving time-stamped/time-sensitive aspects, improved access/utilization and/or other features are disclosed. In one example, an illustrative system may comprise a hub computer platform and associated computing components configured to generate a plurality of portals including at least first and second portals, including aspects such as automatically updating information on a real-time basis, automatically attaching and/or processing timestamps that are attached to orders upon receipt and acceptance thereof, continuously generating and/or processing information of an order file, generating, continuously updating and/or interactively displaying various tabular and/or graphical information that are based on real-time order file updates, generating other GUI features that, for example, may graphically display and continually update level-of-involvement information, and/or displaying, to investors, information and metrics based on real-time order file updates.

345 Claims, 10 Drawing Sheets

Related U.S. Application Data continuation of application No. 14/340,774, filed on Jul. 25, 2014, now Pat. No. 11,195,230.

(56) References Cited

U.S. PATENT DOCUMENTS

| | | | |
|---|---|---|---|
| 7,702,550 B2 | 4/2010 | Perg et al. | |
| 7,822,655 B1 | 10/2010 | La Quinta et al. | |
| 7,827,089 B2* | 11/2010 | Sweeting | G06Q 40/06 705/37 |
| 7,856,395 B2* | 12/2010 | Jackson | G06Q 40/04 705/37 |
| 7,945,502 B2* | 5/2011 | Mashinsky | G06Q 40/00 705/37 |
| 8,799,133 B2 | 8/2014 | Gula, IV | |
| 8,812,384 B2 | 8/2014 | Zhang et al. | |
| 8,874,477 B2 | 10/2014 | Hoffberg | |
| 8,935,181 B2 | 1/2015 | Rosenberg | |
| 9,009,783 B2 | 4/2015 | Bartholomay et al. | |
| 9,105,150 B2 | 8/2015 | Nguyen et al. | |
| 9,129,284 B2 | 9/2015 | Sarkissian et al. | |
| 9,501,795 B1* | 11/2016 | Friedman | G06Q 40/06 |
| 9,652,803 B2* | 5/2017 | Lane | G06Q 40/04 |
| 2001/0038347 A1* | 11/2001 | Avery | G06T 9/007 341/51 |
| 2002/0007335 A1* | 1/2002 | Millard | G06Q 40/04 705/37 |
| 2002/0194110 A1 | 12/2002 | Young | |
| 2003/0200167 A1* | 10/2003 | Kemp, II | G06Q 40/04 705/37 |
| 2003/0216926 A1 | 11/2003 | Scotto et al. | |
| 2004/0193519 A1* | 9/2004 | Sweeting | G06Q 40/04 705/35 |
| 2005/0160017 A1* | 7/2005 | Chestopalov | G06Q 40/12 705/37 |
| 2006/0036531 A1* | 2/2006 | Jackson | G06Q 20/042 705/37 |
| 2007/0083457 A1 | 4/2007 | Evelyn et al. | |
| 2007/0130042 A1 | 6/2007 | Dryden | |
| 2007/0150405 A1 | 6/2007 | Greenberg et al. | |
| 2007/0244788 A1* | 10/2007 | Ferris | G06Q 40/06 705/36 R |
| 2008/0243709 A1* | 10/2008 | Mintz | G06Q 40/00 705/37 |
| 2010/0100967 A1 | 4/2010 | Douglas et al. | |
| 2010/0211494 A1 | 8/2010 | Clements | |
| 2011/0125626 A1 | 5/2011 | Shalen | |
| 2011/0153521 A1* | 6/2011 | Green | G06Q 40/06 705/36 R |
| 2012/0022989 A1* | 1/2012 | Vasinkevich | G06Q 40/00 705/35 |
| 2012/0047059 A1 | 2/2012 | Vasinkevich | |
| 2012/0109809 A1* | 5/2012 | Sweeting | G06Q 40/04 705/37 |
| 2012/0239463 A1* | 9/2012 | Wertz | G06Q 10/0637 705/7.39 |
| 2014/0279347 A1 | 9/2014 | Avery | |
| 2014/0297497 A1 | 10/2014 | Altomare | |
| 2014/0324669 A1* | 10/2014 | McLean | G06Q 40/04 705/37 |
| 2015/0050922 A1 | 2/2015 | Ramalingam et al. | |
| 2015/0178835 A1 | 6/2015 | Quillian | |
| 2015/0347750 A1 | 12/2015 | Lietz et al. | |
| 2016/0027110 A1* | 1/2016 | Blum | G06Q 40/04 705/37 |
| 2016/0371777 A1* | 12/2016 | Perrett | G06Q 40/04 |
| 2017/0032458 A1* | 2/2017 | Dembo | G06Q 40/02 |
| 2017/0032462 A1* | 2/2017 | Perrett | H04L 69/161 |
| 2017/0154337 A1* | 6/2017 | Wingate-Whyte | G06Q 30/0631 |
| 2017/0206602 A1* | 7/2017 | Sallent | G06Q 40/04 |
| 2017/0293980 A1* | 10/2017 | Phillips | G06Q 40/08 |
| 2017/0301024 A1* | 10/2017 | Dalal | G06Q 40/06 |
| 2018/0144403 A1* | 5/2018 | Heimowitz | G06Q 40/02 |

OTHER PUBLICATIONS

J Christopher Westland; Theordore H. Clark, "Electronic Auctions and Intermediaries," in Global Electronic Commerce: Theory and Case Studies , MIT Press, 1999, pp. 343-383. (Auction) (Year: 1999).*

International Search Report (2 pgs) and Written Opinion (8 pgs) dated Oct. 5, 2015, in International Application No. PCT/US2015/040258, 10 pages, total.

J. Christopher Westland; Theodore H. Clark; "Chap. 7 Electronic Auctions and Intermediaries," in Global Electronic Commerce: Theory and Case Studies, MIT Press, 1999, pp. 343-383 (39 pgs).

* cited by examiner

FIG. 5 clearingbid™ — Home | About Us | News | Partners | Contact | Logout

Logged in User: South Asia Financial_BD_USR_BD1

Open Offerings (501)

Closed Offerings | Upcoming Offerings | Enter Order

| Name | Ticker | Market | Time Remaining | 507 | Market Value | No. of Holders | My No. of Holders | No. of Shares | My No. of Shares |
|---|---|---|---|---|---|---|---|---|---|
| Bay Street Latin American Mining ETF | CA0001 | ARCA | 4 days | 27.70 | 16,243,280 | 1488 | 220 (14%) | 586,400 | 47,300 (8%) |
| All-Asia Dim Sum ETF | CA0002 | BATS | 4 days | 34.41 | 17,642,007 | 2281 | 246 (10%) | 512,700 | 32,900 (6%) |
| North American Fracking ETF | CA0003 | NDAQ | 4 days | 22.35 | 18,934,920 | 2044 | 250 (12%) | 847,200 | 52,500 (6%) |
| Aegean Hospicality ETF | CA0004 | ARCA | 5 days | 20.80 | 11,743,680 | 1973 | 194 (9%) | 564,600 | 46,200 (8%) |
| India Motors ETF | CA0005 | NDAQ | 5 days | 18.58 | 16,458,164 | 2013 | 198 (9%) | 885,800 | 60,100 (6%) |

My Orders (503)

| Limit Price | No. of Shares | Value | Account | Branch | FA ID | Timestamp |
|---|---|---|---|---|---|---|
| 29.00 | 300 | 8,301 | 1534923 | 01 | U124 | 2014-07-02 09:54:09 |
| 30.00 | 400 | 11,068 | 1810995 | 91 | U104 | 2014-07-02 09:43:15 |
| 25.00 | 100 | 2,767 | 1151475 | 74 | U145 | 2014-07-02 09:39:16 |
| 29.00 | 400 | 11,068 | 1540228 | 25 | U177 | 2014-07-02 09:30:23 |

Bay Street Latin American Mining ETF

| Name | Bay Street Latin American Mining ETF |
|---|---|
| Min. Market Value | 35,000,000 |
| Market Value | 16,243,280 |
| Min.No.of Holders | 3000 (below current iNav: 73) |
| No.of Holders | 1488 |
| My No.of Holders | 220 |
| My No. of Shares | 47,300 (below current iNav: 15,700) |
| iNAV | 27.70 ← 502 |
| Fee per Share | 0.15 |
| Ticker | CA0001 |

Bay Street Latin American Mining ETF — chart (27.60, 27.20, 26.80, 26.40, 26.00, 25.60, 25.20; 6/26, 6/27, 6/30, 7/1; 35M, 3K)

Suspend All Orders

© 2014-2021 ClearingBid, Inc - All Rights Reserved

SYSTEMS AND METHODS INVOLVING A HUB PLATFORM AND COMMUNICATION NETWORK CONFIGURED FOR PROCESSING DATA INVOLVING TIME-STAMPED/TIME-SENSITIVE ASPECTS AND/OR OTHER FEATURES

CROSS-REFERENCE TO AND INCORPORATION OF RELATED APPLICATION(S)

This is a continuation of application Ser. No. 17/544,890, filed Dec. 7, 2021, published as US2022/0172288A1, now U.S. Pat. No. 11,694,262, which is a continuation of application Ser. No. 14/340,774, filed Jul. 25, 2014, published as US2016/0027109A1, now U.S. Pat. No. 11,195,230, issued Dec. 7, 2021, all of which are incorporated herein by reference in entirety.

COPYRIGHT NOTICE

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

FIELD OF THE INVENTION

The present invention generally relates to methods, processes and systems to be used within financial markets for the non-partisan marketing, distribution, pricing and allocation of new issue securities in a way that seeks to maximize investor participation. More particularly, the disclosed invention relates to computerized systems, processes and methods for (a) electronically marketing new issue securities offerings using a global communications network and using existing order routing networks to gather orders for such offerings as part of an open and transparent ordering process, and for (b) allocating and distributing the new issue securities based upon the orders received during the marketing period. In certain applications the present invention will disclose minimum offering thresholds that the offering must meet before investor orders will be confirmed and filled. The present inventive system comprises an independent entity having no competing business interests in common with other securities industry constituents, thereby helping to promote broad participation by investors and their broker-dealer advisors.

BACKGROUND OF THE INVENTIVE SYSTEM AND METHODOLOGY

The present invention was developed to address the reality that there are millions of investors—along with their financial advisors—who are completely disconnected from the offering process for new issues of securities. This is because the legacy offering methodology does not elicit or reward their interest with allocations; yet the pool of investment capital that can be accessed is enormous by any measure and is of great importance to the capital formation process in general and any issuer seeking to access capital in the public markets.

For decades, new securities issues have been brought to market through an underwriting group, led by a lead manager, using a methodology commonly known as "book building." The distribution of these new securities issues, using the book building methodology, has almost always favored the lead manager and its investor clients to the exclusion of non-proprietary investor clients whose potential interest in the offerings is not invited and is routinely discarded.

To improve upon the current methodology, a new method and system must, at its core, be fair, be transparent, and be open to the entire investing public. While the markets have rebounded from the financial crisis of 2008, many investors are still unable to participate in the new issue offering process because of a lack of transparency in and access to the book building process, and because market information and benefits that arise from new offerings are routinely directed to a select group of entities, many of whom are afforded preferential consideration.

The present invention will engage all interested investors in the new issue offering process without regard to which financial advisors they have already chosen to do business with. This will be done by applying well-tested technology and protocols as an overlay to existing securities industry infrastructure—in a new way—that preserves industry incentives and investor protection measures while bringing much higher levels of transparency to the price discovery and demand discovery processes. The market positioning of the present invention comprising, in part, an independent entity is essential for the successful elicitation of interest from all investors while identifying and qualifying true market demand and market-derived pricing.

The present invention will provide for the dissemination of information about each of the public offerings that are presented by the hub entity without restriction and, importantly, the inventive methodology will not allow the independent hub entity to accept any orders from investors directly. Instead, investors will be directed to discuss any presented offering with the financial advisor of their choice, thereby preserving suitability testing and other important investor protection measures already in place throughout the securities industry. Moreover, by offering investors a single resource for information about available new offerings, the present invention will serve as a common calendar for all the new offerings for which it is engaged to bring to the market. Furthermore, the present invention will offer investors real-time updates about indicative pricing and order flow activity, and by disseminating minimum offering threshold parameters for contingent offerings, investors will be able to evaluate each offering on the basis of its order population (i.e., current demand levels) during the marketing period. This will help neutralize investor concerns about the timing of their order submission—earlier vs. later in the marketing period. These features of the present invention, operating as parts of a single platform, are expected to assemble a definitive sample of demand for each new issue offering it is engaged to facilitate, thereby bringing long-overdue improvements to this process and renewing wide-spread investor participation that will support the healthy growth of the U.S. capital formation process.

Public trust in the U.S. financial markets is of paramount importance to everyone, yet tensions between the financial services industry and Washington, D.C. have barely lessened since 2008, and the public perception of the financial investing industry is at historic lows. In response to these concerns, the Dodd-Frank Act was passed and signed into law in 2010. It called for stricter regulation of the banking and securities industries and for more stringent capital standards, including the "Volcker Rule." Further, the fact that most of the key financial institutions are now deemed to be "Too Big to Fail" pits systemic risk concerns and the restraint of adverse incentives against the ongoing need for innovation and access to capital to support growth in both the public and private sectors. As further evidence of this point, a survey conducted in May of 2014 among senior financial services industry professionals found that 81% of the respondents indicated that "the financial crisis still has a major impact on stakeholder perception." Survey respondents also cited, among other issues, that "rebuilding trust in the overall financial system" is a critical success factor in their struggle to restore the industry's reputation.

With respect to one particular segment of the financial market—new issue securities offering process—the current pricing and allocation process, known as book-building, has remained the same for decades, yet it has many weaknesses and problems inherent in how the process operates. Indeed, the 2012 Facebook initial public offering ("IPO") refocused attention on the several shortcomings of new issue book-building methodologies. Notably, in a June 2012 letter to the Chairman of the Securities and Exchange Commission ("SEC") from Darrell Issa, Chairman of the House Committee of Government Oversight and Reform, specific questions and concerns were raised about features of book building as they were applied in the Facebook IPO. The features mentioned in the letter included institutional investor dominance of allocations, lead manager discretion as to pricing and allocation, the ability to use non-market based pricing for a new issue and the incidence of under-pricing, and barriers to information being disseminated to the broader market.

As illustrated in FIG. 1A, current book-building methodology is non-transparent, with limited public information about the offering, little information provided about the pricing process for the offering, and no real opportunity for the majority of investors to participate on a consistent basis. All marketing information about an offering is funneled through one entity, the lead manager or lead agent, so the opportunity to take part is typically limited to the lead manager's own sales organization. Given the control the lead manager has over the book-building process, there is little incentive for other securities firms to participate or support the offering, so the process of determining an accurate offering price is subject to errors due to the limited sample of market interest that can be gathered. The offering price may also be subject to last minute orders submitted by influential accounts. Furthermore, allocations of the offered securities to investors are often based on arbitrary factors. Inherently, the lead manager has relatively broad discretion over which investor interest to include or exclude and how much to allocate to each. Moreover, in instances when the lead manager has its own capital at risk, it may be incentivized to underprice an offering to reduce the risk of loss of its own capital while creating an upside for certain client investors. This underpricing may result in substantial investment proceeds not being realized by the issuer while increasing aftermarket volatility and prompting investors who were shut out of the offering to have to pay potentially higher prices for the same security, along with a commission.

Many market constituents have noted deep concerns about the book building process of managing new securities issues. In addition to the equity IPO problems that have received wide attention, the public offering process in the municipal bond and taxable fixed income markets are also under regulatory scrutiny. Market regulators have noted how all markets would benefit from a more inclusive, transparent process for managing new issues of securities. To be able to attain these goals, there is a need for enhanced connectivity, for real-time information distribution to the investing public, and a need for greater transparency as the markets seek a broader population of broker-dealers and new pockets of investor capital. It has been expressed that the expansion of the industry's distribution infrastructure, and the dissemination of new issue offering information to enhance the investors' decision process, could remedy many of these concerns.

Certain systems and processes have been developed and implemented in attempts to address some of the above noted issues. For example, the concept of a "Dutch auction" has been used for distributing certain securities. By way of example, U.S. Pat. No. 7,647,270 issued to Evelyn et al., for a System and Methods for Pricing and Allocation of Commodities or Securities discloses a "bid mechanism whereby bidders are rewarded for priority of anonymously revealing their bids and provide an allocation of the securities which allows winning bidders to pay a single market-clearing price that sells out the securities." The '270 patented system and methods also "allow all participants to monitor the auction in real time." While the '270 patent describes use of a type of auction process—an open Dutch auction system—whereby the bidders are allocated securities based upon the amount bid and the timing of the bid, the auction system is nonetheless controlled by the issue's lead underwriter and "auction advisor." Such a system retains an important weakness inherent in current market book-built offerings, which is that it requires investor orders be placed with the lead underwriter firm that generally determines which orders are filled, while discouraging other securities firms from participating or supporting the offering.

There have also been several examples of auction type formats used for new issue offerings or IPOs within the past several years. In August 2004, Google Inc. completed its IPO using an auction-based offering format. While the Google IPO transaction had several problems, it was successful at raising $1.67 billion during a very uneasy market environment. Some of the Google IPO drawbacks were that (a) Google required a time-consuming pre-qualification protocol as a condition for being allowed to bid in the IPO; (b) the Google IPO was distributed through only a limited syndicate of 28 broker-dealers; and (c) the Google IPO lead managers were not deemed to be supportive of a Dutch auction-type process. These issues compromised the execution of the offering and led to a substantial discount in the offering price compared to its price in the aftermarket trading, which is typical in book-built IPOs. In further resemblance to book-built IPOs, the Google IPO experienced heavy first-day trading volume, in which secondary trading volume exceeded the size of the entire IPO offering. This pattern of underpricing, followed by heavy first-day trading volume, is common among book-built offerings and is clear evidence that such offerings are placed with investors who are "buying the offering" with the expectation of quick profits.

Almost three years later, in May of 2007, Interactive Brokers Group, Inc. ("IAB") completed its IPO also using a Dutch auction-based procedure. The IAB IPO, although not as large as Google, was considered successful and is indicative of the growing acceptance by investors of auction procedures for new issue securities. The IAB IPO was also noteworthy because it was an agency, non-underwritten offering, and there was less of a pricing discount than would otherwise have been expected had the offering been managed as a traditional book-built offering. However, the IAB IPO did not provide any mechanism to augment demand discovery. Indeed, the Dutch auction mechanism, as used in the Google, IAB and other IPOs, while having the laudable objective of improving price discovery for new issue offerings, is merely that—a price discovery mechanism that by itself, and in the hands of an offering's lead manager, does little to expand investor access and improve demand discovery.

As a further example of the use of current technology to broadly involve the public in determining the acceptance and/or value of new ideas, several websites and organizations have been created to provide crowdfunding or crowdsourcing mechanisms. Kickstarter, Indiegogo, Artistshares, Fan Funded, and Rockethub are several current crowdfunding platforms, with Kickstarter and Indiegogo being the most widely cited. While the basic concept of seeking public input to determine whether a new idea, product, creative output, or service is warranted is not necessarily a new idea, the detailed implementation of such a concept into the Internet with its social media implications is a new idea that has generated substantial interest and positive results for many creative works, ideas, innovations and products.

One example of a method and apparatus for crowdsourcing is U.S. Pat. No. 7,885,887 issued in 2011 to Carmelio, and assigned to ArtistShare, Inc., for Methods and Apparatuses For Financing and Marketing A Creative Work. The '887 patent systems and methods are specifically for raising financing and/or revenue by an artist for a project created by the artist. While the '887 patent discloses methods for collecting funding for creative products, the patent does not teach any steps or systems for providing demand or price discovery relating to financial securities or within the investment market. While crowdfunding has generated a lot of excitement as a possible means for gathering capital from the broader public, it exists outside the regulated securities industry environment and as such its users lack access to the expertise and advice available from trained investment advisors to guide prudent and informed investment decisions on the part of the public at large. The JOBS Act, which was passed into law to support crowdfunding in limited circumstances, charged the SEC with the development of regulations to provide appropriate oversight to this process. As of this date, the SEC has yet to issue any draft rules or regulations for public comment.

Accordingly, there is a compelling need for new systems, processes and methodologies for facilitating the pricing, allocation and distribution of new securities offerings that offer appropriate levels of transparency and access to all investors, that facilitate the application of fiduciary and suitability standards testing, and provide for enhanced price discovery along with unique demand discovery tools. The present invention recognizes the drawbacks of the several prior attempts to address some of the weaknesses of the current capital formation process for new issues, and provides an innovative system, process and methodology incorporating several new and important features to address this challenge and several of the flaws inherent in the current methodologies and systems.

SUMMARY OF THE INVENTION

The above noted problems inadequately or incompletely resolved by the prior art are addressed and resolved by the present invention.

A preferred aspect of the invention is a computerized method for conducting new issue securities offerings provided by issuing entities, said method operated by a centralized hub entity, and said method comprising the steps of (a) publishing new issue securities information, (b) accepting orders for said new issue securities, (c) updating the new issue securities offering information in real-time, (d) providing secure electronic portals for each of said at least one lead agent, and said issuing entity to access each entity's respective data and information, (e) upon conclusion of a marketing period, determining an offering price for said new issue securities; (f) disseminating said determined offering price; (g) calculating allocation information for said new issue securities to be issued for each accepted order, (h) preparing a final listing of securities allocation information, and (i) transmitting said final listing of securities allocation information to said at least one lead agent for settlement and to said issuer.

Another preferred aspect of the present invention is a process to market, price and allocate new issue securities using an on-line global communications network, comprising a hub entity, at least one issuing entity, a plurality of investors, and at least one lead agent, the process steps comprising (a) said hub entity providing real-time offering information to said global communications network; (b) said hub entity providing a secure portal for accepting orders on behalf of said plurality of investors relating to said new issue securities; (c) said hub entity updating said real-time securities offering information based on said orders submitted on behalf of said plurality of investors; (d) said hub entity closing an offering link on said on-line portal after termination of a marketing period, and after a preselected threshold of orders have been submitted on behalf of said plurality of investors; (e) after termination of said marketing period, said issuing entity and said at least one lead agent determining an offering price for said new issue securities; (f) said hub entity disseminating said determined offering price to at least said plurality of investors; (g) said hub entity calculating allocation information for said new issue securities to be issued for each accepted order; (h) said hub entity providing said allocation information to said plurality of investors and at least one lead agent based upon a final list of orders submitted on behalf of said plurality of investors; and (i) said at least one lead agent settling allocations based upon said submitted orders and based upon said final listing of orders.

Still another preferred embodiment of the present inventive device is a system for conducting new issue securities offerings, comprising a hub entity operating a computer processor with associated data memory; at least one new issue securities issuer, at least one lead agent; a plurality of broker-dealers; and a plurality of investors associated with said respective plurality of broker-dealers; wherein said computer processor executes process steps comprising (a) providing real-time offering information to a global communications network; (b) providing an on-line portal for communication with said plurality of broker-dealers for the purpose of accepting orders from said plurality of broker-dealers submitted on behalf of said respective plurality of investors, relating to said new issue securities; (c) updating said real-time securities offering information based on said orders submitted by said plurality of broker-dealers; (d) said hub entity closing an offering link on said on-line portal after termination of a marketing period, and after a preselected threshold of orders have been submitted by said plurality of broker-dealers on behalf of said respective investors; (e) alter termination of said marketing period, said issuing entity and said at least one lead agent determining an offering price for said new issue securities; (f) said hub entity disseminating said determined offering price to at least said plurality of investors; (g) said hub entity calculating allocation information for said new issues securities for each accepted order, (h) providing said allocation information to said plurality of broker-dealers, said plurality of investors and at least one lead agent based upon a final listing of orders submitted by said plurality of broker-dealers; and (i) said at least one lead agent settling allocations with said plurality of broker-dealers based upon said submitted orders and based upon said final listing of orders.

For each of the preferred aspects and preferred embodiments described above, a further element of the inventive method and process could provide for the acceptance of orders from the plurality of broker-dealers using various existing securities order routing networks.

The invention will be best understood by reading the following detailed description of the preferred embodiments in conjunction with the drawings briefly described below.

BRIEF DESCRIPTION OF THE DRAWINGS

For the purposes of illustrating the invention, the attached drawings show several aspects and embodiments that are presently preferred. However, it should be understood that the invention is not limited to the precise arrangement and instrumentality shown in the accompanying drawings.

FIG. 5: is an example screen shot of the hub entity website showing, after proper authentication of the user, information relevant to each participating broker-dealer;

DESCRIPTION OF THE PREFERRED EXEMPLARY EMBODIMENTS

An innovative system, process and methodology have been designed to address the new issue offering methodology problems and issues described above which are not addressed by the known prior art. The system implements a methodology and process that offers, for multiple market sectors, a robust new platform and channel to provide for the non-partisan pricing, allocation and distribution of new issue securities. The inventive system has application to new issue securities offerings including Exchange-Traded Funds ("ETFs") and other managed investment products, taxable and tax-exempt debt, equity IPOs and follow-ons, and other similar types of securities offerings.

Figure 1A:
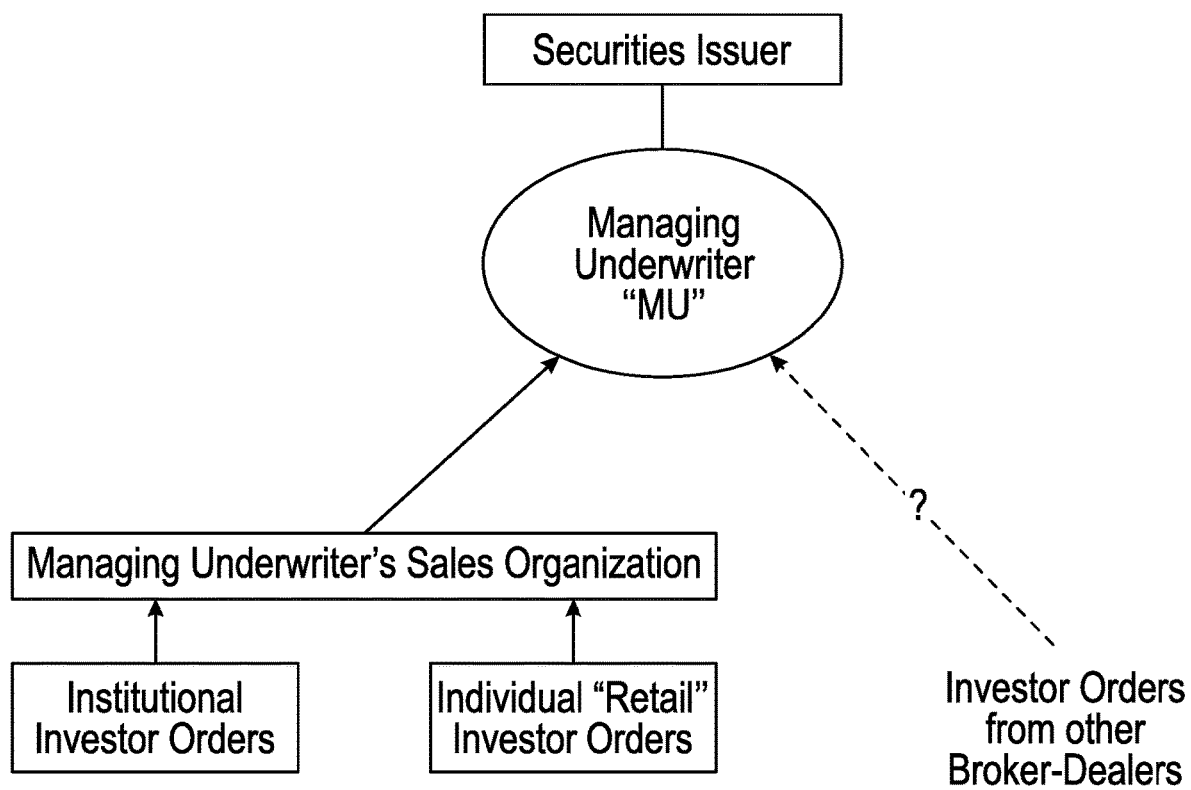
FIG. 1A: is an illustration of the constituents within prior art book-building for new issue security offerings.
Figure 1B:
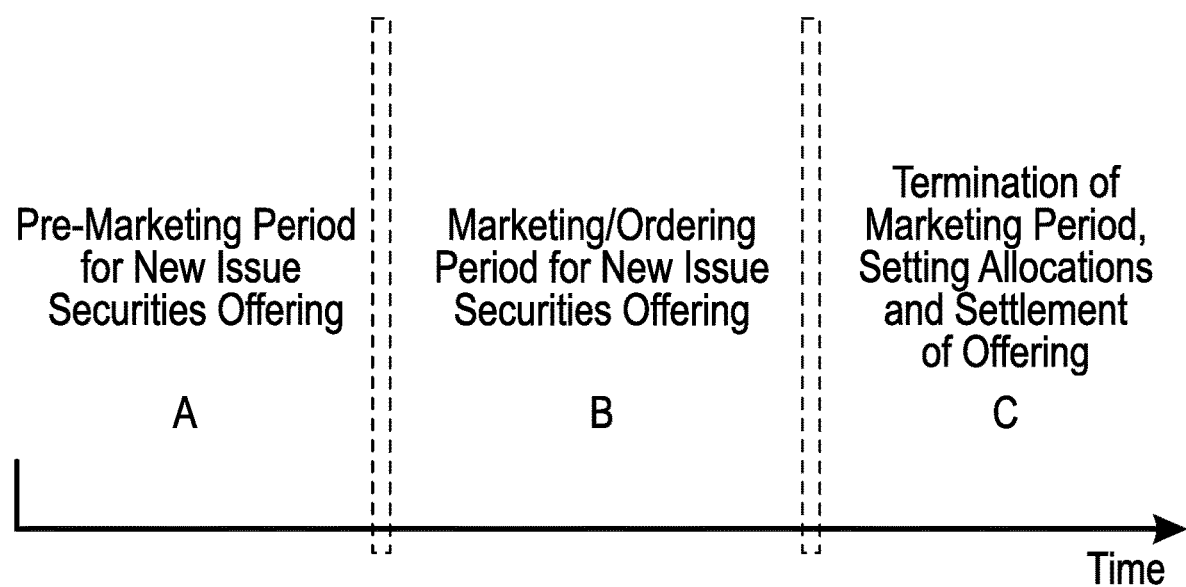
FIG. 1B: is an illustration of the timeline segments relating to new issue security offerings.

The general timeline for creating, allocating and distributing new issue securities is illustrated in FIG. 1B. The timeline typically has three basic periods: a pre-marketing period A; a marketing/ordering period B; and the post-marketing period that includes the setting of allocations and the settlement of the offering C. The inventive system and methodology operates primarily in time period B, although in some embodiments, the methodology also encompasses operation within time periods A and C.

Figure 2:
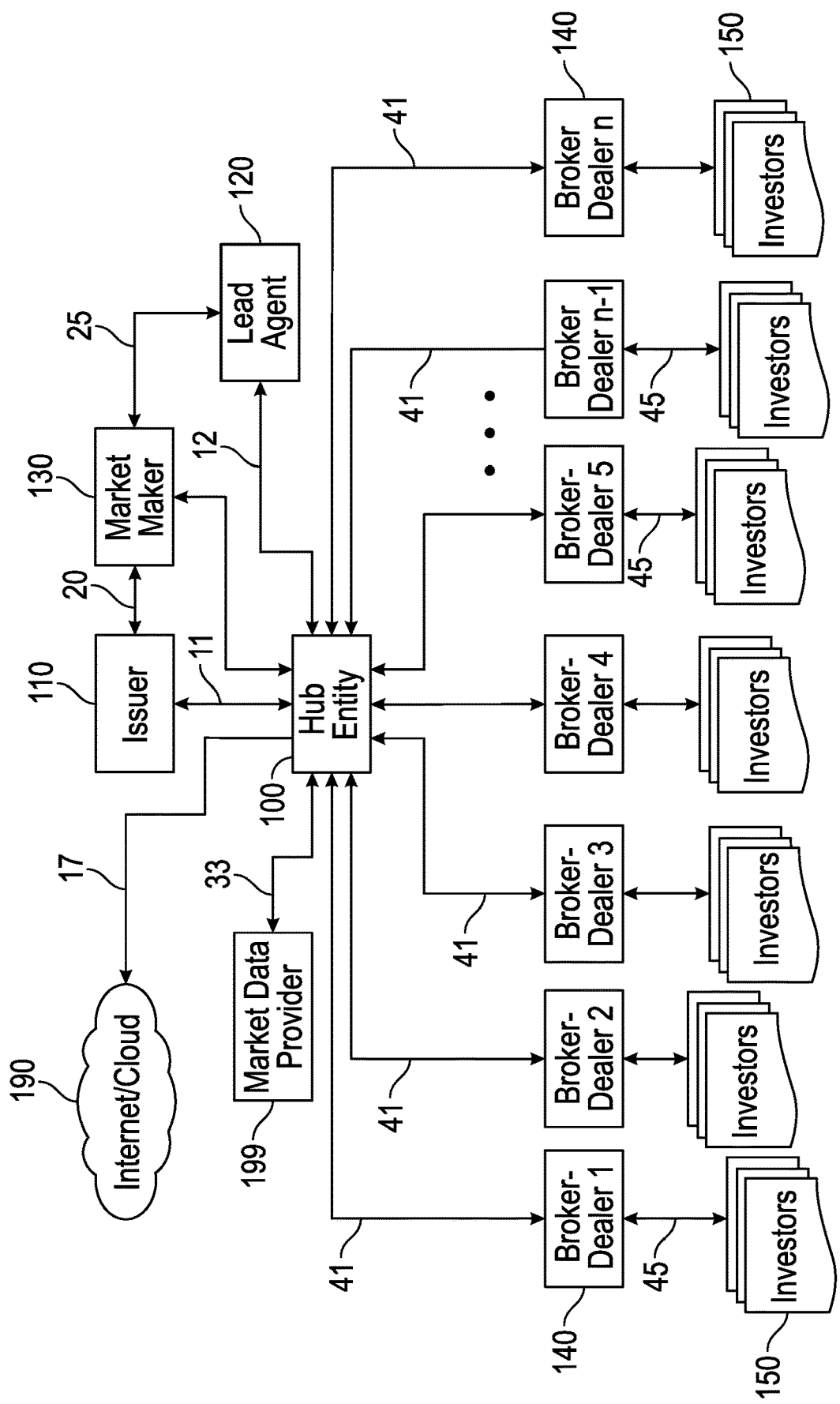
FIG. 2: is a system flowchart of an exemplary embodiment of the present invention showing the primary constituents and communication flow among such constituents.

The primary elements or entities included in the inventive systems, methods and processes are illustrated in the FIG. 2 system flow diagram. At the core of the systems, processes and methodologies is the hub entity 100. The hub entity 100 is the information resource for the new issue offerings for institutional investors and the investing public in general. The hub entity 100 also gathers investor orders from the financial advisors that the investors do business with, and provides the electronic platform and channel for demand discovery, price discovery, and transparent, non-partisan new issue pricing, allocation and distribution.

The hub entity 100 has certain communication links and pathways 11, 12, 17, 33, 41 with several of the other entities (respectively the issuer 110, lead agent 120, Internet/Cloud 190, and broker-dealers 140) using or involved with the process and system. More particularly, the primary entities involved with the system include the issuer 110, who desires to sell new issue securities to the investing public in consideration and return for investment capital. The issuer 110 uses one or more lead or managing agent(s) 120 who acts as the primary relationship manager with the issuer 110, and is a key offering advisor and marketing agent for the issuer 110. More particularly, the lead agent 120 is expected to oversee the pre-offering due diligence and the advisory process with the issuer 110. The lead agent 120 also handles the preparation of the registration statement and related documents, and prepares any "road show" and ancillary marketing materials that may be useful or necessary to support the offering.

In certain markets, such as the ETF market, the issuer 110 also works with a market maker 130 to create the new issue securities against the lead agent 120 order list that has been created, and is maintained by the hub entity 100 as part of the described methodology. In certain other markets, and in other exemplary embodiments, the issuer 110 would directly create the new issue securities after the completion of the offering.

At the other end of the market spectrum, as shown in FIG. 2, are the investors 150 wishing to invest in the issuer's new offering. In a preferred embodiment, the investors 150 work with their respective financial advisors, who are employees of broker-dealers 140, to place limit orders for the new issue securities with the hub entity 100. Finally, the hub entity 100 may exchange information with one or more market data provider(s) 199 that is relevant to the offerings during both the pre-marketing and the marketing periods. Such information from the market data provider 199 may include, again in the instance of the ETF market, an estimate of the interim net asset value ("iNAV") that is based upon the current market value of the securities that underlie the now ETF offering.

As further shown in FIG. 2, the connection between the hub entity 100 and the investors 150 for providing order submissions is through each of the investors' respective broker-dealers 140. There currently are approximately 650 distinct self-clearing broker-dealers doing business with the U.S. public. The inventive system is designed to provide a direct communication link 41 between the hub entity 100 with each of the potential 650 broker-dealers 140 that desires to and agrees to participate in the inventive system. In a preferred embodiment, the inventive system will be able to connect to each of these broker-dealers 140 in the same manner that existing stock exchanges are able to connect to broker-dealers for routine secondary market trading order flow. It is important to note that such communication channels between the stock exchanges and broker-dealers, used for secondary market trading orders, have never before been used to support or provide for participation in new issue offerings. Accordingly, this feature of the inventive methodology and system leaves intact all of the internal order routing/management protocols that are currently in use. Because the hub entity 100 directly communicates 41 with, and can accept orders from, the full universe of broker-dealers 140, the system provides, as compared to the current book-building system, an open platform for the entire investing public to have access to new issue offerings.

Figure 3:
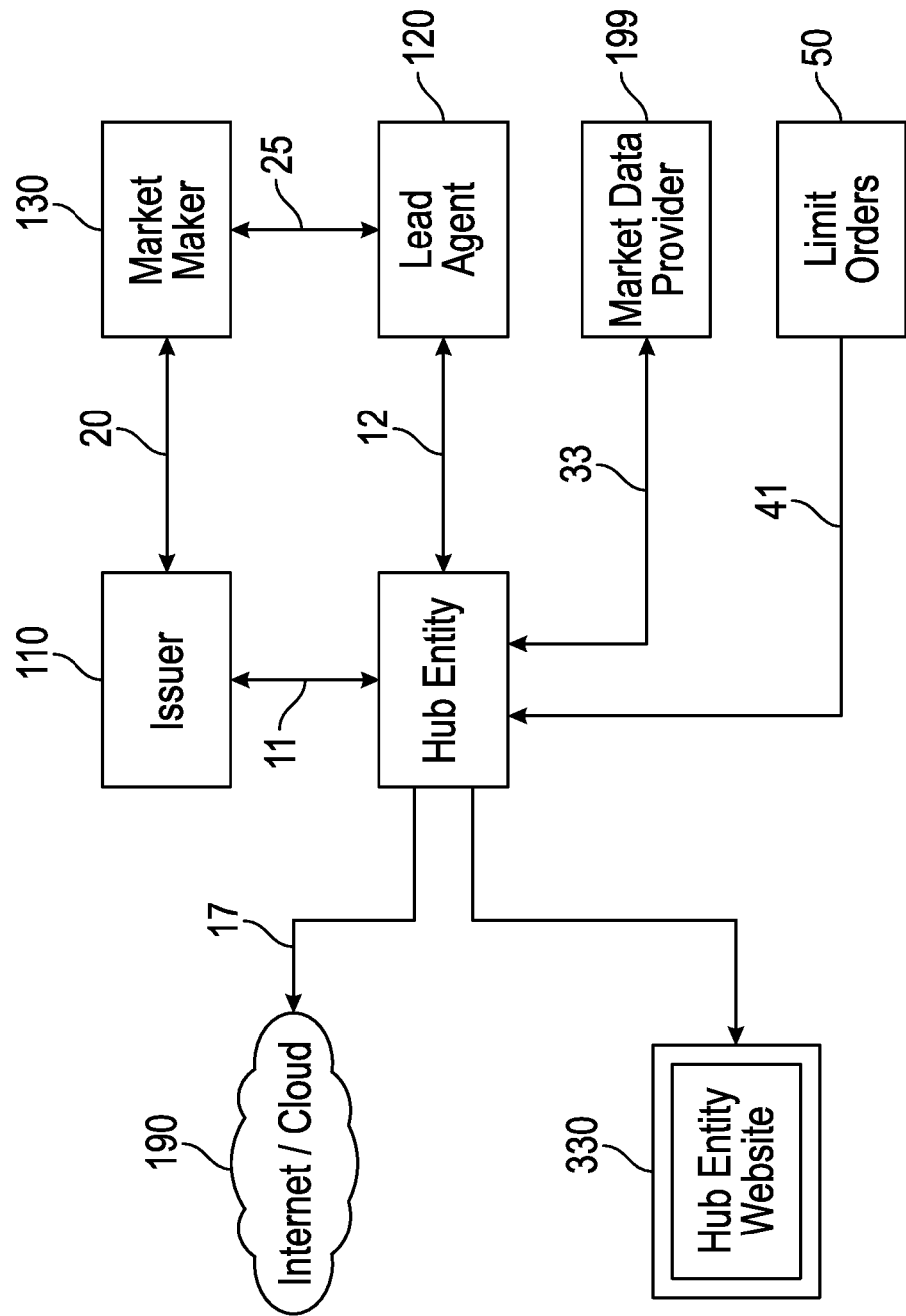
FIG. 3: is a partial system flowchart of an exemplary embodiment of the present invention showing key constituents and communication flow between such constituents.

While order submissions cannot be made directly by an investor 150 to the hub entity 100, there are at least two channels of communication, and information flow from the hub entity 100 to the investor community 150. As illustrated in FIGS. 2 and 3, the hub entity 100 publishes various offering information to the general public through its website 330, and also provides order management messaging and actions through its order routing network 41 to the investors' 150 broker-dealers 140. Such information is, in part, presented to the investor community 150 with unrestricted access.

According to preferred embodiments, each broker-dealer 140 communicates 45 with and receives 45 order information from its respective investors 150 for the new issue offerings being presented by the hub entity 100. After receipt 45 of the investors' order information, the broker-dealer 140 confirms 45 back to the respective investor 150 the investor's order information. Because the hub entity 100 will not interfere with the relationships between the broker-dealers 140 and their respective investor clients 150, the broker-dealers will continue, as part of their relationship management with their clients, to provide periodic communications 45 with their client investors 150, in order to manage order prices and eligibility for order execution, and to ensure sufficient cash or equity is available in each investors' account to complete and settle the order executions should the new issue offering achieve its stated minimum required funding levels. It is also expected that, similar to their current relationship management, the broker-dealers 140 will perform suitability, appropriateness and customer knowledge reviews of each investor 150 prior to accepting any such orders from any particular investor clients 150.

After receipt of the orders from its investors 150, each broker-dealer 140 then communicates 41 such order information to the hub entity 100 in the form of limit orders. The submitted information includes, as shown in FIG. 3, the limit orders 50 for the desired securities, comprising, in exemplary embodiments, the number of shares/units/bonds ordered by each investor 150 at the maximum acceptable price levels. Such order information must also specify the investor's account number and the originating branch office and respective financial advisor identifiers.

The hub entity collects the plurality of limit orders 50 in an order list for the offering, and confirms back to the respective broker-dealer 140 the limit orders 50 placed with each broker-dealer 140 for each investor 150. In an exemplary embodiment, the hub entity 100 communicates with each broker-dealer 140 for order submission, and for subsequent information of the status of the orders placed, using Financial Information eXchange ("FIX") protocols. Such communications between the hub entity 100 and the broker-dealers 140 allow for appropriate consistent interface with the broker-dealer order routing networks that are in use today.

The hub entity 100 will also advise the broker-dealer(s) 140 which of the orders received from the broker-dealer 140 are, or are not, executable based upon the then current calculated iNAV or other indicative reference price such as a coupon/interest rate or price per share. Further, the hub entity 100 will be able to communicate to each broker-dealer 140 certain relevant analytics relating to the orders 50 submitted by the broker-dealer. Such analytics, in some embodiments, may include the broker-dealers' orders as a percentage of all orders received and holders for each offering. The hub entity 100 will further disclose to the broker-dealers 140 the selling fee to be paid per share or per unit of the new security based upon the anticipated execution of all eligible orders 50. In an exemplary embodiment, certain of the information provided by the hub entity 100 to the broker-dealers 140 may be secured with limited access through, for example, a password-protected link to a limited access information page.

As described above, the investors 150 are required to communicate directly with their respective broker-dealers 140, and not the hub entity 100. More specifically, the hub entity 100 will not accept orders directly from any of the individual investors 150 thereby preserving the existing relationships in place between the investors 150 and the broker-dealers 140. While the hub entity 100 will not accept orders directly from investors 150, the hub entity 100 will, as shown in FIG. 3, still have a public communication link with the investing public 150 through the Cloud 190 and through the hub entity website 330. The hub entity 100 will use the Cloud 190 to provide general offering information to the investors 150, to assist them in reaching an informed investment decision in consultation with their broker-dealers 140.

Figure 4:
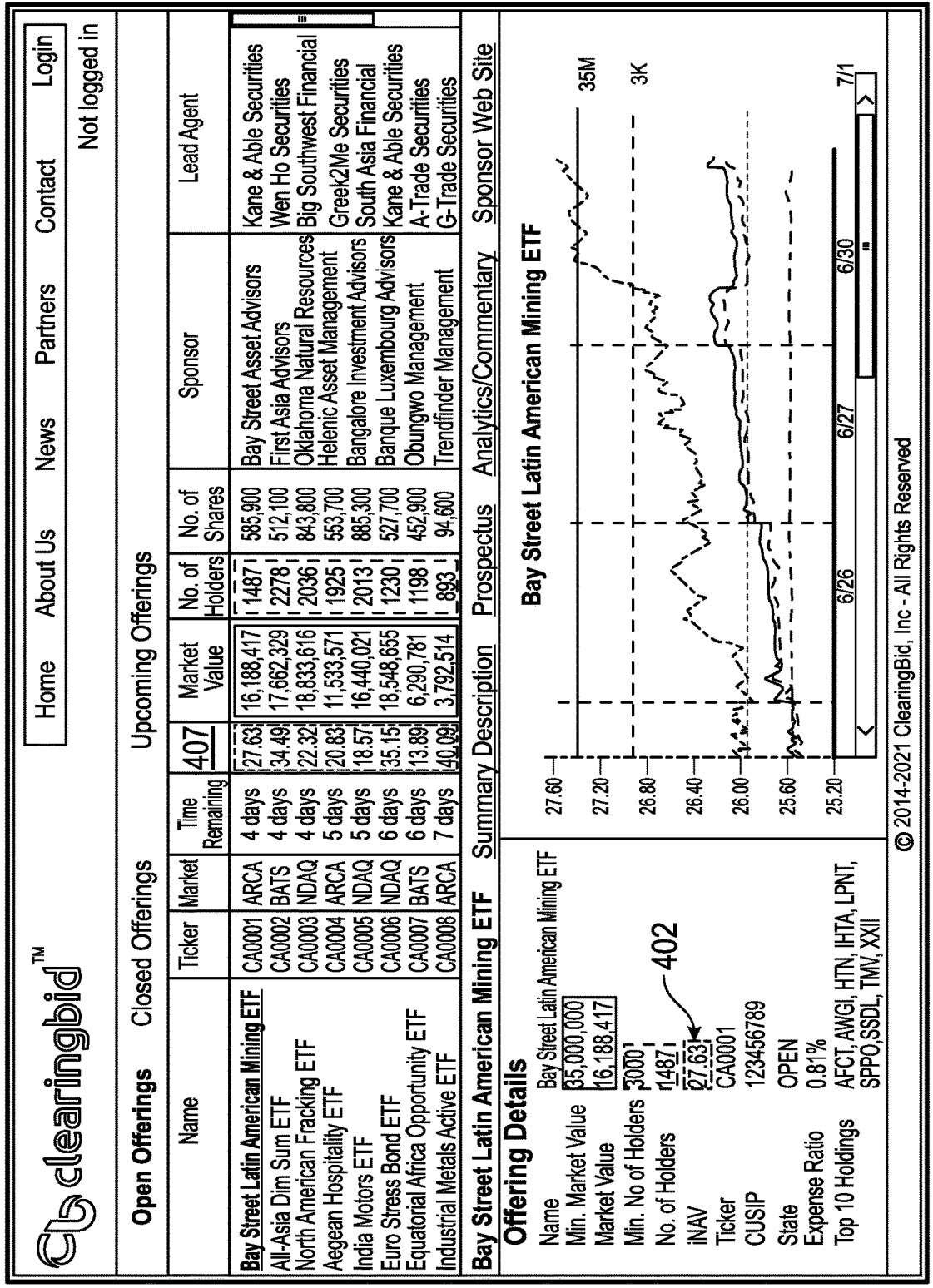
FIG. 4: is an example screen shot of the hub entity website showing home page unrestricted offering information that will be available to all public investors and their financial advisors.
Figure 6:
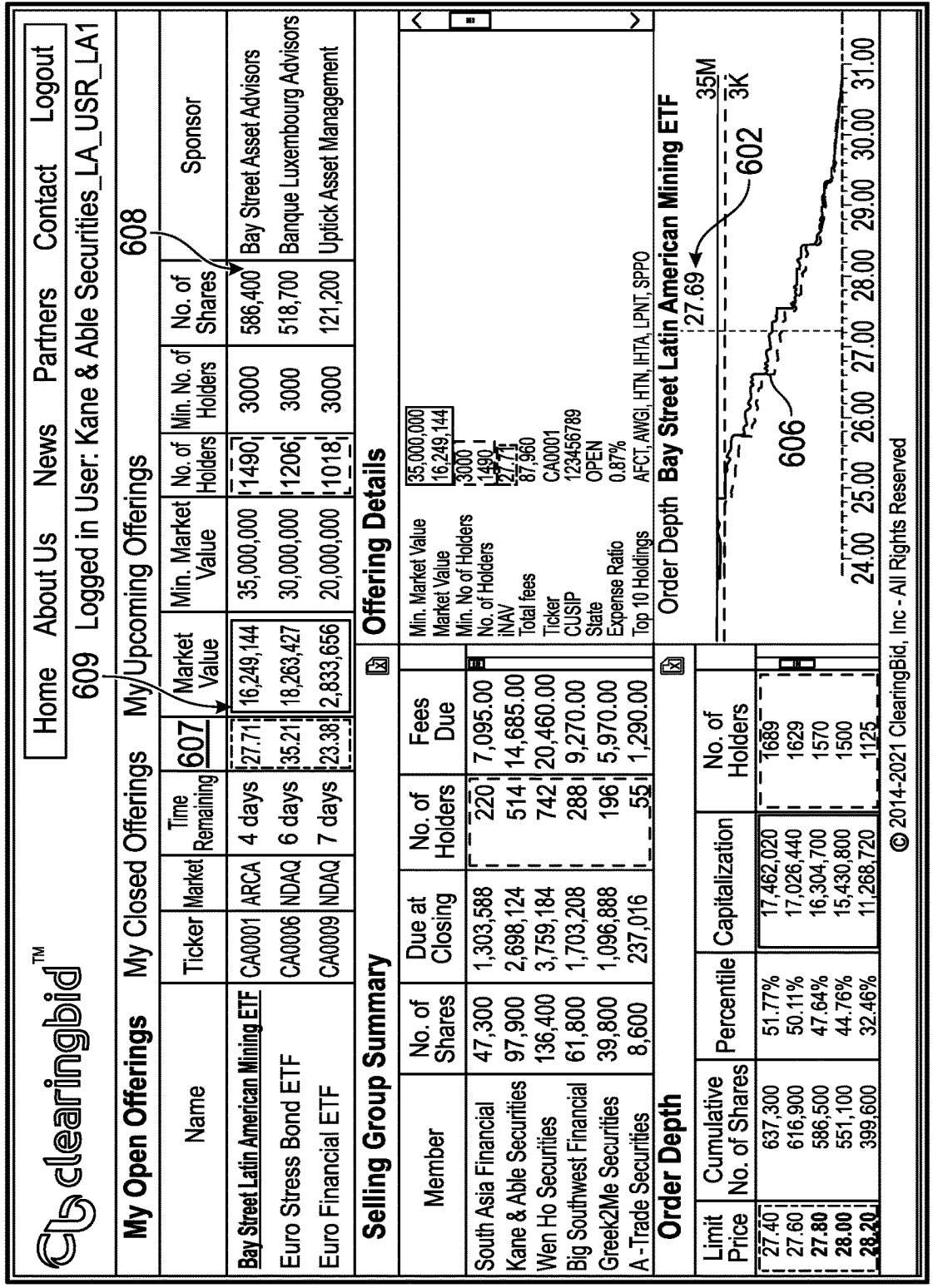
FIG. 6: is an example screen shot of the hub entity website showing, after proper authentication of the user, information relevant to each lead agent and issuer of each offering.

More particularly, with respect to an embodiment of the hub entity website 330, as shown in the FIGS. 4, 5, and 6 example screenshots, the hub entity 100, through its website 330, or by directly uploading 17 to the Cloud 190, can provide certain offering information through unrestricted access to all investors 150, broker-dealers 140, lead agents 120, investment banks, market makers 130, issuers 110, and market data providers 199. The available information uploaded 17 by the huh entity 100 to the Cloud 190, may include a listing of open and closed offerings; real-time offering data for each open offering; links to offering-related information including the final prospectus for each offering; third party market commentary and analytics; links to the issuers' website; and other similar resources and information.

In other exemplary embodiments, also shown in FIGS. 4, 5, and 6, the hub entity 100 will publish on its website 330 detailed content and graphical information of all offerings currently being marketed, as well as a listing of expected future hub entity offerings. Such a display provides a "common calendar" of now issues intending to go to market, along with the dates for the anticipated closing of each offering. The hub entity 100 will also publish to the Cloud 190 any issuer 110 mandates, conditions or requirements relating to the offering size and/or number of holders.

As further shown in the example screen shot of FIG. 5, the hub entity 100 can provide through its website 330 specific administrative information for each participating broker-dealer 140, including a listing of the offerings to which the broker-dealer 140 has submitted at least one investor order. Also illustrated in FIG. 5 is an example of how the hub entity 100 can provide certain analytics and statistics to each broker-dealer, showing the level of involvement of the broker-dealer 140 in each specific offering. This same webpage could provide a means for the broker-dealer to cancel or amend individual orders for particular offerings, or indeed to suspend all orders for all offerings, as shown by the red button located at the lower right hand corner of the FIG. 5 example webpage.

Similarly, the hub entity 100 can provide a specific webpage with relevant data and information for each offering's lead agent(s) 120, as shown in the example screen shot of FIG. 6. This page, controlled and published by the hub entity 100, would show the offerings in which the lead agent 120 is the lead agent, in addition to further detailed information specifically relevant to that particular lead agent 120. Further detailed offering data and information could also be presented for lead agents to use. By way of one example, as shown on FIG. 6 (lower right hand corner), the hub entity could provide real-time graphical data of the level of orders at each particular offering price, along with the intended threshold of capital amount and number of shares. With such a graphical presentation, the lead agent 120 can readily see the offering's total share value and other order metrics at which the intended threshold of capital and/or number of desired shareholders will be met.

In some embodiments, the hub entity 100 will also have a link 12 to and provide detailed information to the issuer's lead agent 120, including the status of all orders for the offering(s) being managed by the lead agent 120. In exemplary embodiments, the hub entity 100 can also provide summary information to the lead agent 120 relating to each broker-dealer 140, including the number of shares or units or bonds ordered, as well as the number of holders represented by each respective broker-dealer order. The hub entity 100 is also able to provide to the lead agent 120 a picture of the global demand for the offering at each price level represented in the then current order file maintained by the hub entity 100.

As also shown in FIG. 2, the hub entity 100 will have a communications link 11 with the issuer 110. In exemplary embodiments, the hub entity will be able to provide to the issuer 110 full information and status of the orders placed by the full pool of participating broker-dealers 140. The hub entity 100 will also be able to provide to the issuer 110 certain price sensitivity information showing the investors' demand for the offering at specific price levels and the resulting size of the book of orders. As part of the communication from the issuer 110 to the hub entity, the issuer 110 will provide to the hub entity 100 minimum offering parameters, which may include a minimum number of holders, a minimum dollar amount raised, or other relevant metrics that will be disseminated to the investor community through the hub entity's 100 website 330.

As a means for the public to generally discover the scope and workings of the present invention system and methodology, the hub entity 100 will also provide links from its website 330 to various tutorials describing the present invention's system, process and methodology, while also including various links to relevant investor reference information.

In some exemplary embodiments, the hub entity 100 may also electronically provide offering and road show materials to the market at large via the Internet by employing links from or to the websites operated by one or more of the issuer 110, the lead agent/securities firm 120, the SEC's link to EDGAR (or EMMA for municipal securities), and/or third-party providers of analytics and market commentary. With such readily linked information, investors will have a wealth of information for immediate review to assist in deciding whether to invest in one or more of new issue offerings presented by the hub entity 100.

The market data provider (or exchange) 199 shown in FIG. 2 has a role in the inventive system to calculate certain asset value information, and a role in the post-marketing period once secondary trading commences. As shown in FIG. 2, during the marketing period the hub entity 100 communicates 33 with the market data provider 199 to provide the market data provider with the specifications for the required data resources. The market data provider 199 uses the specifications to calculate the data resources that are disseminated on the hub entity's 100 website 330. In exemplary embodiments, it is expected that the market data provider 199 will update the iNAV or other indicative reference metrics on a set time frame interval of every 15 seconds, although other update time frames may be implemented or used by the hub entity 100.

In certain exemplary embodiments, the marketing process of an offering using the inventive system and methodology will strive to target the pricing range specified in the SEC filing for the public offering. Towards this goal, a summary profile of investor orders 50 received will be broadly disseminated and updated on a real-time basis by the hub entity 100 during the marketing period. This marketing effort will encompass the lead manager's internal sales efforts as well as other efforts to raise the offering's visibility to the market at large. Since the lead manager/agent 120 will have unique insight into the features of the issuer's 110 offering, as noted above, the lead agent 120 will likely become the primary contact point for interested institutional investors 150 while still allowing all other participating firms and their clients to achieve equal access to information through the hub entity 100 and to the offering. This equal access to all investors 150 and participating broker-dealer firms 140 is a key advantage of the inventive system, process and methodology.

While the lead manager/agent 120 and the issuer 110 will have access to summary order data in the hub entity 100 order file on a real-time basis during the marketing period, other firms will not have direct access to the same level of information about the offering. Instead, the non-lead broker-dealers 140 will only have access to all individual orders 50 submitted by their own financial advisors to monitor their own order flow for compliance, sales management and syndicate accounting purposes.

At the time that the marketing period is to be closed, the system also provides a mechanism for the hub entity 100 to commence the closing process based upon a consensus decision to do so being reached through collaboration between the lead manager/agent 120 and the issuer 110. More particularly, for any offering that has reached or exceeded the issuer's 110 offering criteria, the hub entity 100 will announce on its website 330 that the order period will close at it specific time. At that time, the hub entity 100 closes the marketing period for the offering and, through review of the order file, collects and finalizes all orders 50 submitted by the investors 150 through their respective broker-dealers 140. The hub entity 100 then provides to the lead manager/agent 120 the detailed settlement information for all broker-dealers 140 that have placed eligible orders for the offering to facilitate the remittance of correct settlement amounts to the lead manager/agent 120 in exchange for the delivery via book entry of the offering's securities to each participating broker-dealer 120.

For non-ETF market applications, once the marketing period is closed and the hub entity 100 finalizes the submitted limit orders 50, the allocation of securities in such an offering will be made pursuant to an auction model that gives preference to orders based upon price or some other disclosed methodology. To reward the early placement of orders, the hub entity 100 may specify on its website 330 that orders placed during a specific time frame will be eligible for higher fill rates. If an early time preference is featured for any offering, the orders 50 that are placed during the open time window, and which are deemed competitive based upon price, will be allocated a greater percentage or proportion of their order 50 amount than orders that are placed outside of that time window. In some embodiments, order fill rates may also vary according to their specified prices. By way of example, the higher the order price, or the lower the interest rate, the greater the allocation preference to that investor.

The "clearing price," or the price at which all offered securities can be fully subscribed for and sold, will be determined by the hub entity 100, the lead manager/agent 120 and the issuer 110 using the comprehensive information about market demand for the new offering as gathered by the hub entity 100 during the marketing period. The issuer 110 and the lead manager/agent 120 will reserve the ability, in their discretion, to choose an offering price that is more attractive for investors than the "clearing price." This discretion to select an offering price is an element of some embodiments notwithstanding that the closing price shall be the same for all investors 150 whose orders are qualified to be filled. The hub entity 100 can also exclude any order 50, investor account 150 or broker-dealer 140 that the hub entity 100 determines is disruptive or unreliable.

As described above, the three features of the inventive system and methodology are: (1) a well-articulated auction methodology; (2) electronic connectivity with all broker-dealers doing business with the public, coupled with the ability to broadcast real-time offering data over the Internet during the marketing period; and (3) true independence within the securities industry. The combination of the hub entity's 100 three core features establishes a new bargain with investors—unlike current methodologies and systems, investors in the hub entity's 100 offerings will receive allocations based solely on the prices they are willing to bid.

The inventive systems and methodologies have certain attributes and features similar to current crowdsourcing systems. However, the present invention is distinct and requires participating investors to have accounts with broker-dealers to preserve the investor protection benefits that are part of the regulated industry environment. More particularly, the present invention provides an electronic system and platform for issuers 110 to present new issue securities offerings to the investor public 150 in order to determine the level of investor interest in the offering. Moreover, the present invention also provides a transparent and non-partisan methodology for the market to establish an appropriate offering price (price discovery), as well as a level of investor interest (demand discovery) for the new issue securities. Such systems and methodologies do not exist in today's market.

A Preferred Embodiment of the Operation of the Methodology

Figure 7A:
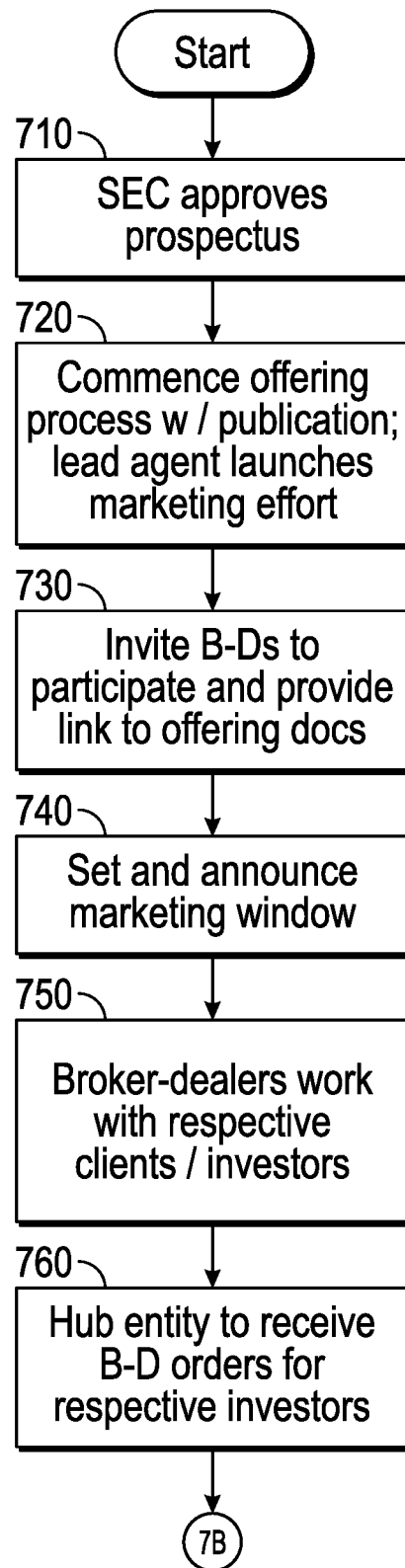
FIG. 7A: is an operational flowchart of an exemplary embodiment of the commencing steps of the marketing period under the inventive methodology.
Figure 7B:
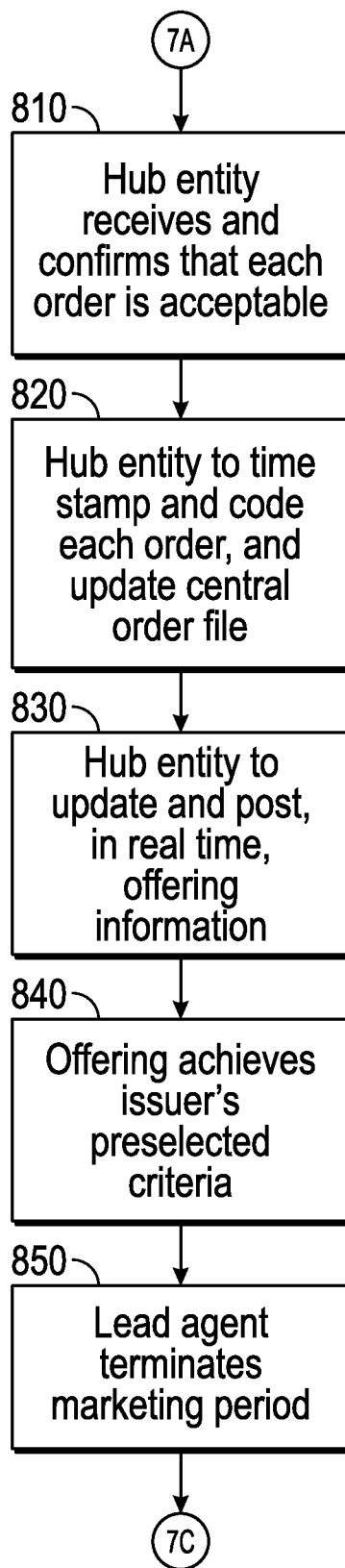
FIG. 7B: is a subsequent operational flowchart of an exemplary embodiment of the steps for conducting the offering auction under the inventive methodology.
Figure 7C:
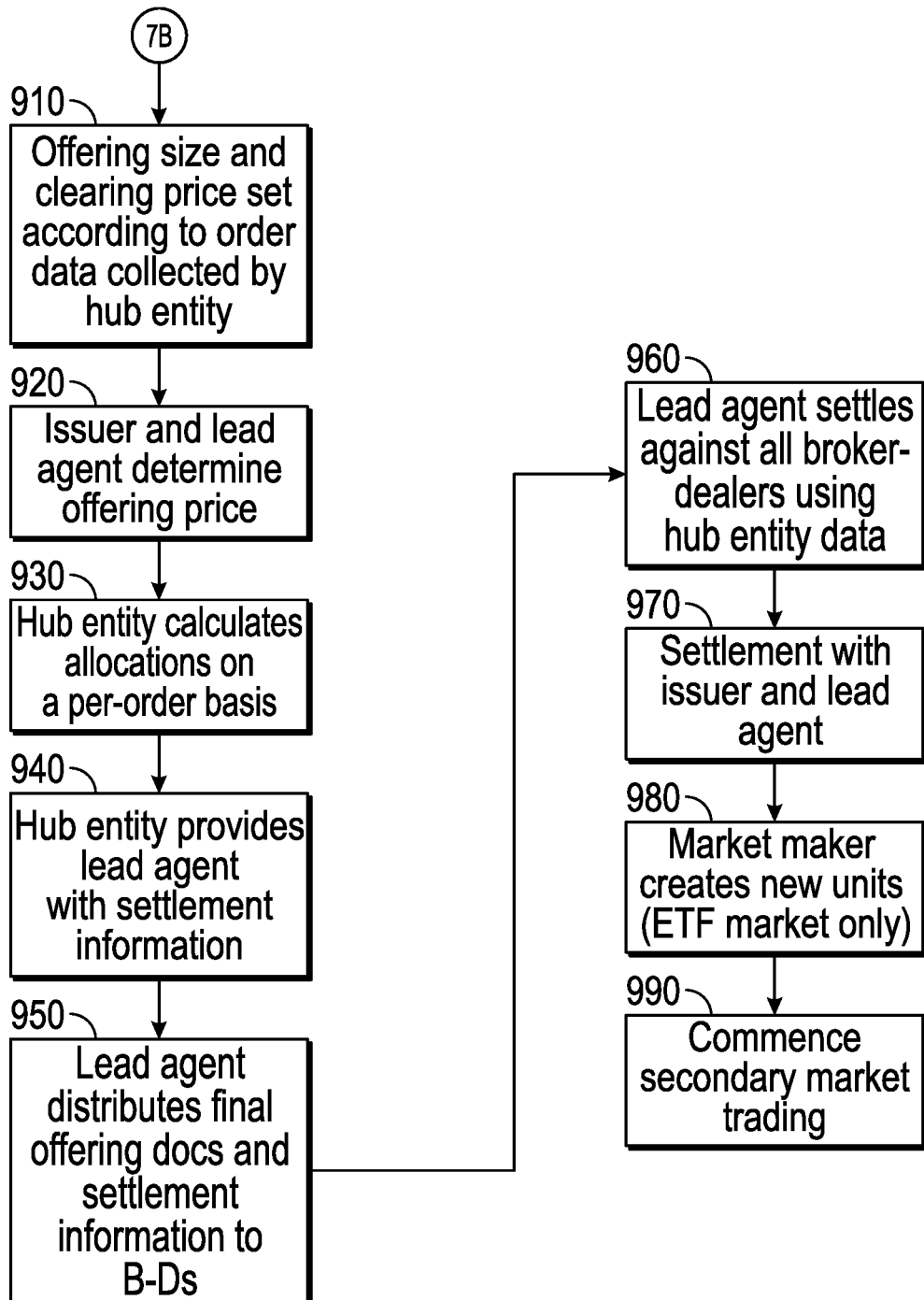
FIG. 7C: is a subsequent operational flowchart of an exemplary embodiment of the steps for concluding the offering auction under the inventive methodology.

The inventive system implements a process and methodology, in an exemplary embodiment, that operates according to the steps as shown in FIGS. 7A through 7C. More particularly, starting with FIG. 7A, in the case of an ETF, after the issuer 110 receives 710 SEC approval of the offering prospectus, the marketing period can commence. At this time, the lead agent 120 is able to launch 720 the marketing effort for the new issue offering by announcing and distributing relevant offering information. The hub entity 100 also publishes offering documents and information, including the offering time window for the marketing period, through the hub entity's website 330 and related technology/media. The offering information published by the hub entity 100 at this time would also include references and electronic links to the offering documents, the timetable for the offering, other relevant offering details, and standard and appropriate offering disclaimers.

Next, the hub entity 100 would electronically transmit 730 an invitation to the full broker-dealer community 140 providing high-level details about the offering and providing an electronic link to the offering documents. As part of any offering announcement, the hub entity 100 would describe the relevant features of the offering/auction protocols, which could include:

(a) the requirement that any investor 150 consult with their own financial advisor—who would be an employee of a broker-dealer 140—about the offering;

(b) that final offering securities allocations are to be based upon the prices of the orders submitted by the pool of investors 150, which shall be in the form of limit orders that specify the maximum price that the investor is willing to pay;

(c) that once orders are submitted by the investors 150, such orders will be deemed to be "good-'til-cancelled" (or GTC) orders unless either (i) the offering price falls outside previously disclosed parameters, or (ii) the hub entity 100 receives a cancellation notice from the investor's respective broker-dealer 140 prior to the deadline for submitting such cancellation notices;

(d) that the hub entity 100 may allocate securities on a pro-rata basis or some other disclosed methodology if demand for an offering exceeds the offering size at the final determined offering price;

(e) that the hub entity 100 reserves the right to exclude any order it reasonably deems to be manipulative or unreliable; and (f) the maximum amount for which any one investor 150 may bid. By way of exemplary embodiment, such maximum amount may be up to 5.0% of the total offering size. The maximum percentage will typically be determined by the issuer 110 in close consultation with the lead agent 120 and the hub entity 100.

The hub entity 100, along with the lead agent 120 and the issuer 110 collectively establish 740 the timing and duration of the marketing period. At this time, the hub entity 100 announces details of the offering to the broker-dealer community 140, as well as to appropriate media outlets and financial websites, with the goal of broad information dissemination to the investor community 150. In exemplary embodiments, the media outlets and financial websites could include the Wall Street Journal, New York Times, Bloomberg, Thomson Reuters, Financial Times, Yahoo Finance, Google Finance, and other media outlets.

The broker-dealers 140 then communicate and work 750 with their respective clients and investors 150 to determine any order requests from their respective investors. Importantly, all orders from the broker-dealers 140 must be individually sent to the hub entity 100. Collection or bundling of investor orders by the broker-dealers 140 will not be permitted because the purpose of the inventive methodology and system is to provide equal access to its offerings to all investors. Similarly, all orders made by the lead manager 120 are to be sent to the hub entity 100 individually and, consequently, cannot be bundled.

In a preferred embodiment, offering orders may be submitted 760 to the hub entity 100 by (i) a broker-dealer 140 financial advisor through the broker-dealer electronic order routing system, or (ii) by the financial advisor to the broker-dealer syndicate or relevant trading desk via telephone or entail. It is important that the broker-dealers 140 establish order record protocols with their respective financial advisors for order routing to prevent duplication of orders. As previously described, bids or orders may not be submitted by any investors 150 directly to the hub entity 100. All orders must be from a broker-dealer.

For an order to be accepted 810 by the hub entity 100, it must indicate the price and quantity for each specific bid. In that regard, if an investor 150 wishes to submit bids at multiple price points, each such bid must be entered separately. If there is more than one order at or above the eventual offering price, then all such investor 150 orders are aggregated by the hub entity 100 for acceptance and offering allocation.

As shown in FIG. 7B, upon receipt of and acceptance by the hub entity 100, all orders are automatically 820 time stamped, indicate the originating broker-dealer 140 having identifiers for the originating branch office and financial advisor, and are added to the hub entity's central order book for the relevant offering at the relevant price level.

So long as such orders meet all regulatory and compliance standards, broker-dealers 140 may also submit orders for their own account. To ensure complete disclosure, all such broker-dealer "own account" orders are to be identified and marked "as principal" or with some other similar identifier. Moreover, no such broker-dealer orders will be filled prior to any orders submitted at the same price by the broker-dealer 140 as an agent on behalf of its public investors 150.

As described above, with reference to FIG. 2, during the marketing period, each of the broker-dealers 140 that have submitted acceptable offering orders will have on-line access to their respective offering summary information and order file. More to the point, to ensure appropriate confidentiality, the originating broker-dealers 140 only have access to their respective submitted orders. Such secure information will show all order activity originating from that broker-dealer firm 140, but will not show any information or individual order activity for any other broker-dealers.

During the marketing period, the hub entity 100 will post certain offering-related information through its website 330. Within the hub entity website 330, each offering will have its own dedicated web pages to provide relevant information to the public, with certain of the offering information being updated 830 in real-time. Such relevant public offering information may, in exemplary embodiments, include the (a) total number of offering units subscribed for and the total number of holders represented by these orders, (b) price range for 95% of the orders already submitted, and (c) time remaining in the marketing period for that offering.

At the end of the marketing period, when the offering achieves 840 the issuer's preselected minimum criteria, the lead agent 120 in conjunction with the hub entity 100 posts 850 a notice that the order period has ended. In alternative preferred embodiments, the hub entity 100 could also publish "pre-closing" notices prior to the end of the order period. The hub entity 100 then determines the clearing price at which all the securities being offered can be sold. Further, for the issuer 110 and lead agent 120 analytics purposes, the hub entity 100 may construct and publish, in the hub entity's central order file, a sensitivity analysis showing investor demand at each price increment above and below the clearing price. The hub entity 100 will share the post marketing period calculations and analytics with the lead manager 120 and issuer 110 as soon as practicable after the close of the marketing period.

As suggested above, there may be significant demand for some offerings such that there may be a desire or incentive to increase the size of the offering during the marketing period. If the lead manager 120 and the issuer 110 decide to do this, the marketing period deadline, in some embodiments, may need to be extended to allow for the filing of related, amended offering documents and the dissemination of the new offering size and to gauge market reaction.

After the close of the marketing period, as shown in FIG. 7C, the final offering size and the clearing price are set 910 as a function of the limit order 50 data collected by the hub entity 100. Thereafter, in an exemplary embodiment of the methodology, the issuer 110 and lead agent 120 determine 920 the final offering price. Because the clearing price is determined to ensure that all securities being offered are sold, the final offering price may be lower than the clearing price, thereby setting demand for more securities in excess of the identified quantity. The offering price should not be set higher than the clearing price, because such a price would result in an incomplete sale of the offered securities.

The calculated clearing price and determined offering price are then disseminated or published to the investor community through the hub entity 100 website 330 and through use of the same media outlets and financial websites as described above, including again, by way of example the Wall Street Journal, New York Times, Bloomberg, Thomson Reuters, Financial Times, Yahoo Finance, and Google Finance. Additional information that may be disseminated at the same time includes (a) the total number of bids and amount of securities that were bid for at each price level, (b) the total number of bids and amount of securities bid for at or above the final offering price, and (c) the number of originating broker-dealers.

After the close of the marketing period, the hub entity 100 will calculate 930 all offering allocations on a per-order basis and will transmit confirmations to each of the originating broker-dealers 140 along with settlement instructions and accounting information. The hub entity 100 will also furnish 940 the lead agent 120 with an electronic file having the specific settlement and accounting information for each broker-dealer 140, or on a per-broker-dealer basis. It is expected that each participating broker-dealer 140 will confirm their respective settlement data with the lead agent/manager 120 on the same business day that the offering allocations are transmitted.

The lead agent 120 will then cause the final offering documents to be distributed 950 to all participating broker-dealers 140, who in turn will transmit such documentation to each of their respective investors 150 who are to receive allocations of the offering based upon the orders of each investor. The lead agent 120 will then settle 960 with all broker-dealers 140 using the offering price as published on the hub entity 100 website 330. It is expected that settlement 970 with the issuer 110 will occur with the lead manager 120 on the same business day that settlement occurs with all allocations against payment from participating broker-dealers 140. After settlement occurs, in a preferred embodiment, the market maker is able to create 980 the new offering units. Finally, within two to five business days of the settlement of offering allocations with the investors 150, secondary trading of the offering securities is then expected to commence 990 on an identified exchange.

In some embodiments, for any offering that appears on the hub entity 100 website 330, the issuer 110 may require that there be a minimum amount of securities sold or a minimum number of holders in the hub entity 100 order file before the offering can be priced and closed. If this feature is part of an offering, it will be disclosed to the market as part of the commencement of marketing 740 the offering. In this embodiment of the present invention, investors 150 will only have their accounts debited by their broker-dealers 140 if and when the issuer's 110 minimum offering criteria have been met. Settlement for any offering 970 will follow standard protocols with the lead manager/agent 120 coordinating directly with the each broker-dealer 140 using data provided by the hub entity 100.

As shown in FIG. 1B (segment A), in some embodiments, where such prior information is appropriate, the marketing period may begin with an early order sub-period during which orders that are submitted in that sub-period may be eligible for higher fill rates if they are submitted at prices that meet or exceed the eventual clearing price for the offering. Such pre-market period orders, and the ability to receive higher fill rates will be publicly disseminated by the hub entity 100 on its website 330, or other public media, prior to the opening of the pre-marketing period.

In cases when the marketing period and order window unfolds as expected, and as described above, when the issuer's offering criteria levels are achieved, the offering order window is closed in an expected predictable fashion. However, should unexpected events arise, or certain market turbulence develop, in some embodiments, the hub entity 100 will also be able to suspend all orders for a broker-dealer 140, or for the entire offering. The hub entity 100 will so advise the broker-dealer or broker-dealers 140 of such action during any such periods of market turbulence or where events necessitate such order suspension.

While preferred embodiments of the inventive methods and systems have been described and disclosed, in particular for certain figures and exemplary embodiments relating to securities, including ETFs, such new issue securities are not to be construed as limiting the scope of application of the inventive systems, processes, and methodologies. More particularly, in addition to ETFs, other new issue offerings, including without limitation, taxable and tax-exempt debt, equity IPOs and other similar types of new issue securities offerings may also use the inventive systems, processes, and methodologies. By way of one example, in another specific embodiment, the inventive methods and systems may be applied to secondary market trading in instances where the hub entity 100 can improve market liquidity by allowing investors, through their broker-dealers, to offer all or part of their investment holdings to other investors. The hub entity 100 would act as a matching platform and facilitate settlement in exchange for a fee. In another embodiment, the lead agent, or a lead agent 120 could also operate as the hub entity 100, instead of having distinct business entities operating as the lead agent 120 and hub entity 100.

It will be recognized by those skilled in the art that other modifications, substitutions, and/or other applications are possible and such modifications, substitutions and applications are within the true scope and spirit of the present invention. It is likewise understood that the attached claims are intended to cover all such modifications, substitutions, and/or applications.

What is claimed is:

1. A system comprising:
a hub entity computer platform configured to electronically conduct one or more new issue securities offerings comprising at least one initial or follow-on debt securities offering, wherein a price of the at least one initial or follow-on debt securities offering comprises a price per share, a price per unit, a price per bond, a coupon rate and/or an interest rate;
the computer platform comprising at least one processor and non-transitory computer readable media, the non-transitory computer readable media including computer-readable program instructions that, when executed by the at least one processor, cause the at least one processor to perform operations; and
a communication network in operative communication with the computer platform;
wherein the operations comprise:
generating a plurality of portals including a first portal provided to at least one electronic order routing and management system associated with one or more broker-dealers and a second portal provided to at least one computer associated with at least one lead agent;
wherein a lead agent portal is provided, via the second portal, during marketing of the one or more new issue securities offerings and closing of the one or more new issue securities offerings; and
wherein the computer platform provides, via the first portal, a broker-dealer portal to the one or more broker-dealers to enable brokering of the one or more new issue securities offerings;
processing one or more orders submitted on behalf of one or more investors regarding the one or more new issue securities offerings, the one or more orders being received at the computer platform in real-time during the marketing of the one or more new issue securities offerings, wherein the one or more orders comprise one or more of a new order, an order amendment and/or an order cancellation;
attaching, by the computer platform, automatically upon receipt of the one or more orders by the computer platform, timestamp information to a plurality of orders received at the computer platform;
confirming, by the computer platform, whether or not the one or more orders are acceptable for further processing by the computer platform as accepted orders;
updating an order file with order data regarding the accepted orders (accepted order data) processed by the computer platform;
providing the lead agent portal to the at least one computer associated with the at least one lead agent, wherein the at least one computer associated with the at least one lead agent includes a first graphical user interface, and wherein the computer platform generates and transmits information that causes the first graphical user interface to display:
user interface (UI) information depicting demand at a plurality of price levels corresponding to an associated new issue securities offering of the one or more new issue securities offerings, wherein the UI information depicting demand is continually updated via information transmitted from the computer platform based on real-time processing of the accepted order data;

wherein the UI information depicting demand includes one or both of limit prices and/or cumulative number of shares or bonds or units; and wherein the lead agent portal provides price sensitivity information indicating investor demand, at specific price levels, for the associated new issue securities offering;

providing an informational portal, in the plurality of portals, to a general public for publishing, based on the real-time processing of the accepted order data, offering information regarding the one or more new issue securities offerings including the associated new issue securities offering, the offering information comprising an offering name and/or current indicative pricing;

wherein the current indicative pricing is market-derived pricing derived from the UI information depicting demand and/or the real-time processing of the accepted order data, such that the current indicative pricing thereby reflects current demand during marketing of the associated new issue securities offering;

based on the real-time processing of the accepted order data continually updating the order file and/or the UI information depicting demand;

continually providing updates of the current indicative pricing based on the market-derived pricing;

continually publishing the offering information including the current indicative pricing via one or more of the plurality of portals until the marketing of the associated new issue securities offering concludes;

wherein said continually publishing the offering information including the current indicative pricing, based on the real-time processing of the accepted order data, reflects current market pricing and current market value, to thereby publish demand discovery information and the current indicative pricing, via at least one of the one or more of the plurality of portals;

determining, by the computer platform, for at least one new issue securities offering of the one or more new issue securities offerings, subsequent to termination of marketing of the at least one new issue securities offering, and during closing of the at least one new issue securities offering, a clearing price and/or an offering size of the at least one new issue securities offering;

establishing an offering price of the at least one new issue securities offering, either by setting the offering price based on the clearing price or by receiving the offering price from the at least one lead agent;

disseminating the offering price, of the at least one new issue securities offering, to the one or more broker-dealers, and to the general public via the one or more of the plurality of portals;

generating, for the accepted orders associated with the at least one new issue securities offering, on a per-order basis, allocation information for the at least one new issue securities offering;

generating, one or more final listings of securities allocation information based on the allocation information; and providing at least one of the allocation information and/or the one or more final listings as output.

2. The system of claim 1, wherein the at least one initial or follow-on debt securities offering includes one or more of: collective investment securities, managed investment products, taxable debt and/or tax-exempt debt offerings.

3. The system of claim 2, wherein the operations further comprise:

continually publishing, on the broker-dealer portal, a summary profile for the associated new issue securities offering until the marketing of the associated new issue securities offering concludes;

wherein the summary profile includes two or more of a specified target pricing range, the current indicative pricing, time remaining in the marketing of the associated new issue securities offering, quantity of shares or bonds or units subscribed for, and/or quantity of holders represented by the accepted orders.

4. The system of claim 2, wherein the operations further comprise:

continually publishing, on the informational portal, two or more of a specified target pricing range, the current indicative pricing, a quantity of offering units subscribed for, a quantity of holders represented by the accepted orders, time remaining in the marketing of the associated new issue securities offering, the clearing price, and/or the offering price.

5. The system of claim 2, wherein the operations further comprise:

performing demand discovery, including establishing level of investor interest for the associated new issue securities offering, at the specific price levels, by automatically generating information, in real-time by the computer platform, and updating the level of investor interest at the specific price levels based on the real-time processing of the accepted order data.

6. The system of claim 2, wherein the operations further comprise:

performing price discovery, including establishing a market-derived offer price associated with the associated new issue securities offering via identifying, the current indicative pricing of the associated new issue securities offering, continually publishing updates of the current indicative pricing, and subsequently, during closing of the associated new issue securities offering, determining an associated clearing price for setting the market-derived offer price, based on the associated clearing price.

7. The system of claim 2, wherein the operations further comprise:

providing the lead agent portal to one or more lead or managing agents that manage an issuer's offering, act as an advisor and/or act as a marketing agent, wherein the at least one lead agent is one of the one or more lead or managing agents.

8. The system of claim 2, wherein the allocation information generated on the per-order basis is generated based on one or more of: an order price, an order time, an order size, and/or a pro-rata basis.

9. The system of claim 2, wherein the operations further comprise:

receiving, via the broker-dealer portal, the one or more orders communicated directly from the one or more broker-dealers.

10. The system of claim 2, wherein the operations further comprise:

utilizing existing order routing and/or management protocols to transmit, via at least one of the plurality of portals, electronic data regarding new issue securities offering information associated with the one or more new issue securities offerings.

11. The system of claim 2, wherein the operations further comprise:
connecting the at least one processor with at least one existing order routing and management system of at least one of the one or more broker-dealers.

12. The system of claim 2, wherein the operations further comprise:
connecting the at least one processor with one or more of the at least one electronic order routing and management system, such that the computer platform is configured for direct communication with the one or more of the at least one electronic order routing and management system, using existing order routing and/or management protocols, for order submission and for communicating subsequent information regarding status of the accepted orders processed by the computer platform.

13. The system of claim 12, wherein the existing order routing and/or management protocols include Financial Information eXchange protocols (FIX protocols).

14. The system of claim 2, wherein the allocation information is generated for a plurality of the accepted orders giving priority to the accepted orders having timestamps denoting earlier receipt, such that the accepted orders having earlier timestamps are eligible for allocation at a greater percentage (fill rate) or proportion (fill amount) of an order amount than the accepted orders having later timestamps.

15. The system of claim 2, wherein the operations further comprise:
terminating marketing of the at least one new issue securities offering, either automatically by the computer platform based on preselected criteria or as initiated by the at least one lead agent.

16. The system of claim 2, wherein the operations further comprise:
providing one or more of the at least one allocation information and/or the one or more final listings as output to the first portal and/or the second portal based on a final list of orders submitted via the broker-dealer portal and/or the lead agent portal.

17. The system of claim 2, wherein the operations further comprise:
providing one or more of the at least one allocation information and/or the one or more final listings as output to the broker-dealer portal and/or the lead agent portal based on a final list of the accepted orders.

18. The system of claim 2, wherein the operations further comprise:
transmitting, by the computer platform, during the closing of the at least one new issue securities offering, to respective ones of the one or more broker-dealers having one or more of the accepted orders, the allocation information that is firm-specific to each respective one of the one or more broker-dealers.

19. The system of claim 2, wherein the operations further comprise:
providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields including three or more of a limit price, a number of shares or bonds or units, an order value, account information, and a timestamp generated for each order by the computer platform.

20. The system of claim 2 wherein, for the associated new issue securities offering, the offering information further comprises two or more of:
a current number of shares or bonds or units associated with the accepted orders, where said accepted orders have a limit price at or higher than the current indicative pricing; a current cumulative number of shares or bonds or units associated with the accepted orders per the specific price levels; a current number of holders associated with the accepted orders where said accepted orders have a limit price at or higher than the current indicative pricing; a current number of holders associated with the accepted orders per the specific price levels; a current amount of market value of the accepted orders, where said accepted orders have a limit price at or higher than the current indicative pricing; and/or an amount of time remaining until termination of the marketing of the associated new issue securities offering.

21. The system of claim 2, wherein the operations further comprise:
commencing, subsequent to termination of marketing of one or more of the at least one new issue securities offering, secondary market trading of the one or more of the at least one new issue securities offering.

22. The system of claim 2, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

23. The system of claim 2, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

24. The system of claim 2, wherein the operations further comprise:
establishing the clearing price as a market demand and market-derived price, at which at least a minimum threshold of offered shares or bonds or units of the associated new issue securities offering can be sold.

25. The system of claim 2, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

26. The system of claim 1, wherein the operations further comprise:
continually publishing, on the broker-dealer portal, a summary profile for the associated new issue securities offering until the marketing of the associated new issue securities offering concludes;

wherein the summary profile includes one or more of a specified target pricing range, the current indicative pricing, time remaining in the marketing of the associated new issue securities offering, quantity of shares or bonds or units subscribed for, and/or quantity of holders represented by the accepted orders.

27. The system of claim 26, wherein the operations further comprise:
continually publishing, on the informational portal, one or more of the specified target pricing range, the current indicative pricing, a quantity of offering units subscribed for, a quantity of holders represented by the accepted orders, and/or time remaining in the marketing of the associated new issue securities offering.

28. The system of claim 26, wherein the operations further comprise:
performing demand discovery, including establishing level of investor interest for the associated new issue securities offering, at the specific price levels, by automatically generating information, in real-time by the computer platform, and updating the level of investor interest at the specific price levels based on the real-time processing of the accepted order data.

29. The system of claim 26, wherein the operations further comprise:
performing price discovery, including establishing a market-derived offer price associated with the associated new issue securities offering via identifying, the current indicative pricing of the associated new issue securities offering, continually publishing updates of the current indicative pricing, and subsequently, during closing of the associated new issue securities offering, determining an associated clearing price for setting the market-derived offer price, based on the associated clearing price.

30. The system of claim 26, wherein the operations further comprise:
providing the lead agent portal to one or more lead or managing agents that manage an issuer's offering, act as an advisor and/or act as a marketing agent, wherein the at least one lead agent is one of the one or more lead or managing agents.

31. The system of claim 26, wherein the allocation information generated on the per-order basis is generated based on one or more of: an order price, an order time, an order size, and/or a pro-rata basis.

32. The system of claim 26, wherein the operations further comprise:
receiving, via the broker-dealer portal, the one or more orders communicated directly from the one or more broker-dealers.

33. The system of claim 26, wherein the operations further comprise:
utilizing existing order routing and/or management protocols to transmit, via at least one of the plurality of portals, electronic data regarding new issue securities offering information associated with the one or more new issue securities offerings.

34. The system of claim 26, wherein the operations further comprise:
connecting the at least one processor with at least one existing order routing and management system of at least one of the one or more broker-dealers.

35. The system of claim 26, wherein the operations further comprise:
connecting the at least one processor with one or more of the at least one electronic order routing and management system, such that the computer platform is configured for direct communication with the one or more of the at least one electronic order routing and management system, using existing order routing and/or management protocols, for order submission and for communicating subsequent information regarding status of the accepted orders processed by the computer platform.

36. The system of claim 35, wherein the existing order routing and/or management protocols include Financial Information eXchange protocols (FIX protocols).

37. The system of claim 26, wherein the allocation information is generated for a plurality of the accepted orders giving priority to the accepted orders having timestamps denoting earlier receipt, such that the accepted orders having earlier timestamps are eligible for allocation at a greater percentage (fill rate) or proportion (fill amount) of an order amount than the accepted orders having later timestamps.

38. The system of claim 26, wherein the operations further comprise:
terminating marketing of the at least one new issue securities offering, either automatically by the computer platform based on preselected criteria or as initiated by the at least one lead agent.

39. The system of claim 26, wherein the operations further comprise:
providing one or more of the at least one allocation information and/or the one or more final listings as output to the first portal and/or the second portal based on a final list of orders submitted via the broker-dealer portal and/or the lead agent portal.

40. The system of claim 26, wherein the operations further comprise:
providing one or more of the at least one allocation information and/or the one or more final listings as output to the broker-dealer portal and/or the lead agent portal based on a final list of the accepted orders.

41. The system of claim 26, wherein the operations further comprise:
transmitting, by the computer platform, during the closing of the at least one new issue securities offering, to respective ones of the one or more broker-dealers having one or more of the accepted orders, the allocation information that is firm-specific to each respective one of the one or more broker-dealers.

42. The system of claim 26, wherein the operations further comprise:
providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields including two or more of a limit price, a number of shares or bonds or units, and/or an order value, and one or both of account information, and/or a timestamp generated for each order by the computer platform.

43. The system of claim 26 wherein, for the associated new issue securities offering, the offering information further comprises one or both of:
a current number of shares or bonds or units associated with the accepted orders, where said accepted orders have a limit price at or higher than the current indicative pricing; and/or a current cumulative number of shares or bonds or units associated with the accepted orders per the specific price levels.

44. The system of claim 26, wherein the operations further comprise:
commencing, subsequent to termination of marketing of one or more of the at least one new issue securities offering, secondary market trading of the one or more of the at least one new issue securities offering.

45. The system of claim 26, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

46. The system of claim 26, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

47. The system of claim 26, wherein the operations further comprise:
establishing the clearing price as a market demand and market-derived price, at which at least a minimum threshold of offered shares or bonds or units of the associated new issue securities offering can be sold.

48. The system of claim 26, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

49. The system of claim 1, wherein the operations further comprise:
continually publishing, on the informational portal, one or more of a specified target pricing range, the current indicative pricing, a quantity of offering units subscribed for, a quantity of holders represented by the accepted orders, time remaining in the marketing of the associated new issue securities offering, the clearing price, and/or the offering price.

50. The system of claim 49, wherein the operations further comprise:
performing demand discovery, including establishing level of investor interest for the associated new issue securities offering, at the specific price levels, by automatically generating information, in real-time by the computer platform, and updating the level of investor interest at the specific price levels based on the real-time processing of the accepted order data.

51. The system of claim 49, wherein the operations further comprise:
performing price discovery, including establishing a market-derived offer price associated with the associated new issue securities offering via identifying, the current indicative pricing of the associated new issue securities offering, continually publishing updates of the current indicative pricing, and subsequently, during closing of the associated new issue securities offering, determining an associated clearing price for setting the market-derived offer price, based on the associated clearing price.

52. The system of claim 49, wherein the operations further comprise:
providing the lead agent portal to one or more lead or managing agents that manage an issuer's offering, act as an advisor and/or act as a marketing agent, wherein the at least one lead agent is one of the one or more lead or managing agents.

53. The system of claim 49, wherein the allocation information generated on the per-order basis is generated based on two or more of: an order price, an order time, and/or a pro-rata basis.

54. The system of claim 49, wherein the operations further comprise:
receiving, via the broker-dealer portal, the one or more orders communicated directly from the one or more broker-dealers.

55. The system of claim 49, wherein the operations further comprise:
utilizing existing order routing and/or management protocols to transmit, via at least one of the plurality of portals, electronic data regarding new issue securities offering information associated with the one or more new issue securities offerings.

56. The system of claim 49, wherein the operations further comprise:
connecting the at least one processor with at least one existing order routing and management system of at least one of the one or more broker-dealers.

57. The system of claim 49, wherein the operations further comprise:
connecting the at least one processor with one or more of the at least one electronic order routing and management system, such that the computer platform is configured for direct communication with the one or more of the at least one electronic order routing and management system, using existing order routing and/or management protocols, for order submission and for communicating subsequent information regarding status of the accepted orders processed by the computer platform.

58. The system of claim 57, wherein the existing order routing and/or management protocols include Financial Information eXchange protocols (FIX protocols).

59. The system of claim 49, wherein the allocation information is generated for a plurality of the accepted orders giving priority to the accepted orders having timestamps denoting earlier receipt, such that the accepted orders having earlier timestamps are eligible for allocation at a greater percentage (fill rate) or proportion (fill amount) of an order amount than the accepted orders having later timestamps.

60. The system of claim 49, wherein the operations further comprise:
terminating marketing of the at least one new issue securities offering, either automatically by the computer platform based on preselected criteria or as initiated by the at least one lead agent.

61. The system of claim 49, wherein the operations further comprise:
providing one or more of the at least one allocation information and/or the one or more final listings as output to the first portal and/or the second portal based on a final list of orders submitted via the broker-dealer portal and/or the lead agent portal.

62. The system of claim 49, wherein the operations further comprise:
providing one or more of the at least one allocation information and/or the one or more final listings as output to the broker-dealer portal and/or the lead agent portal based on a final list of the accepted orders.

63. The system of claim 49, wherein the operations further comprise:
transmitting, by the computer platform, during the closing of the at least one new issue securities offering, to respective ones of the one or more broker-dealers having one or more of the accepted orders, the allocation information that is firm-specific to each respective one of the one or more broker-dealers.

64. The system of claim 49, wherein the operations further comprise:
providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields of a limit price, a number of shares or bonds or units, and an order value.

65. The system of claim 49 wherein, for the associated new issue securities offering, the offering information further comprises one or both of:
a current number of shares or bonds or units associated with the accepted orders, where said accepted orders have a limit price at or higher than the current indicative pricing; and/or a current cumulative number of shares or bonds or units associated with the accepted orders per the specific price levels.

66. The system of claim 49, wherein the operations further comprise:
commencing, subsequent to termination of marketing of one or more of the at least one new issue securities offering, secondary market trading of the one or more of the at least one new issue securities offering.

67. The system of claim 49, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

68. The system of claim 49, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

69. The system of claim 49, wherein the operations further comprise:
establishing the clearing price as a market demand and market-derived price, at which at least a minimum threshold of offered shares or bonds or units of the associated new issue securities offering can be sold.

70. The system of claim 49, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

71. The system of claim 1, wherein the operations further comprise:
performing demand discovery, including establishing level of investor interest for the associated new issue securities offering, at the specific price levels, by automatically generating information, in real-time by the computer platform, and updating the level of investor interest at the specific price levels based on the real-time processing of the accepted order data.

72. The system of claim 71, wherein the operations further comprise:
performing price discovery, including establishing a market-derived offer price associated with the associated new issue securities offering via identifying, the current indicative pricing of the associated new issue securities offering, continually publishing updates of the current indicative pricing, and subsequently, during closing of the associated new issue securities offering, determining an associated clearing price for setting the market-derived offer price, based on the associated clearing price.

73. The system of claim 71, wherein the operations further comprise:
providing the lead agent portal to one or more lead or managing agents that manage an issuer's offering, act as an advisor and/or act as a marketing agent, wherein the at least one lead agent is one of the one or more lead or managing agents.

74. The system of claim 71, wherein the allocation information generated on the per-order basis is generated based on an order price and a pro-rata basis.

75. The system of claim 71, wherein the operations further comprise:
receiving, via the broker-dealer portal, the one or more orders communicated directly from the one or more broker-dealers.

76. The system of claim 71, wherein the operations further comprise:
utilizing existing order routing and/or management protocols to transmit, via at least one of the plurality of portals, electronic data regarding new issue securities offering information associated with the one or more new issue securities offerings.

77. The system of claim 71, wherein the operations further comprise:
connecting the at least one processor with at least one existing order routing and management system of at least one of the one or more broker-dealers.

78. The system of claim 71, wherein the operations further comprise:
connecting the at least one processor with one or more of the at least one electronic order routing and management system, such that the computer platform is configured for direct communication with the one or more of the at least one electronic order routing and management system, using existing order routing and/or management protocols, for order submission and for communicating subsequent information regarding status of the accepted orders processed by the computer platform.

79. The system of claim 78, wherein the existing order routing and/or management protocols include Financial Information eXchange protocols (FIX protocols).

80. The system of claim 71, wherein the allocation information is generated for a plurality of the accepted orders giving priority to the accepted orders having timestamps denoting earlier receipt, such that the accepted orders having earlier timestamps are eligible for allocation at a greater percentage (fill rate) or proportion (fill amount) of an order amount than the accepted orders having later timestamps.

81. The system of claim 71, wherein the operations further comprise:
terminating marketing of the at least one new issue securities offering, either automatically by the computer platform based on preselected criteria or as initiated by the at least one lead agent.

82. The system of claim 71, wherein the operations further comprise:
providing one or more of the at least one allocation information and/or the one or more final listings as output to the first portal and/or the second portal based on a final list of orders submitted via the broker-dealer portal and/or the lead agent portal.

83. The system of claim 71, wherein the operations further comprise:
providing one or more of the at least one allocation information and/or the one or more final listings as output to the broker-dealer portal and/or the lead agent portal based on a final list of the accepted orders.

84. The system of claim 71, wherein the operations further comprise:
transmitting, by the computer platform, during the closing of the at least one new issue securities offering, to respective ones of the one or more broker-dealers having one or more of the accepted orders, the allocation information that is firm-specific to each respective one of the one or more broker-dealers.

85. The system of claim 71, wherein the operations further comprise:
providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields including two or more of a limit price, a number of shares or bonds or units, an order value, account information, and a timestamp generated for each order by the computer platform.

86. The system of claim 71 wherein, for the associated new issue securities offering, the offering information further comprises a current number of shares or bonds or units associated with the accepted orders, where said accepted orders have a limit price at or higher than the current indicative pricing, and one or more of:
a current cumulative number of shares or bonds or units associated with the accepted orders per the specific price levels; a current number of holders associated with the accepted orders where said accepted orders have a limit price at or higher than the current indicative pricing; a current number of holders associated with the accepted orders per the specific price levels; a current amount of market value of the accepted orders, where said accepted orders have a limit price at or higher than the current indicative pricing; and/or an amount of time remaining until termination of the marketing of the associated new issue securities offering.

87. The system of claim 71, wherein the operations further comprise:
commencing, subsequent to termination of marketing of one or more of the at least one new issue securities offering, secondary market trading of the one or more of the at least one new issue securities offering.

88. The system of claim 71, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

89. The system of claim 71, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

90. The system of claim 71, wherein the operations further comprise:
establishing the clearing price as a market demand and market-derived price, at which at least a minimum threshold of offered shares or bonds or units of the associated new issue securities offering can be sold.

91. The system of claim 71, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

92. The system of claim 1, wherein the operations further comprise:
performing price discovery, including establishing a market-derived offer price associated with the associated new issue securities offering via identifying, the current indicative pricing of the associated new issue securities offering, continually publishing updates of the current indicative pricing, and subsequently, during closing of the associated new issue securities offering, determining an associated clearing price for setting the market-derived offer price, based on the associated clearing price.

93. The system of claim 92, wherein the operations further comprise:
providing the lead agent portal to one or more lead or managing agents that manage an issuer's offering, act as an advisor and/or act as a marketing agent, wherein the at least one lead agent is one of the one or more lead or managing agents.

94. The system of claim 92, wherein the allocation information generated on the per-order basis is generated based on an order price, an order time, and a pro-rata basis.

95. The system of claim 92, wherein the operations further comprise:
  receiving, via the broker-dealer portal, the one or more orders communicated directly from the one or more broker-dealers.

96. The system of claim 92, wherein the operations further comprise:
  utilizing existing order routing and/or management protocols to transmit, via at least one of the plurality of portals, electronic data regarding new issue securities offering information associated with the one or more new issue securities offerings.

97. The system of claim 92, wherein the operations further comprise:
  connecting the at least one processor with at least one existing order routing and management system of at least one of the one or more broker-dealers.

98. The system of claim 92, wherein the operations further comprise:
  connecting the at least one processor with one or more of the at least one electronic order routing and management system, such that the computer platform is configured for direct communication with the one or more of the at least one electronic order routing and management system, using existing order routing and/or management protocols, for order submission and for communicating subsequent information regarding status of the accepted orders processed by the computer platform.

99. The system of claim 98, wherein the existing order routing and/or management protocols include Financial Information eXchange protocols (FIX protocols).

100. The system of claim 92, wherein the allocation information is generated for a plurality of the accepted orders giving priority to the accepted orders having timestamps denoting earlier receipt, such that the accepted orders having earlier timestamps are eligible for allocation at a greater percentage (fill rate) or proportion (fill amount) of an order amount than the accepted orders having later timestamps.

101. The system of claim 92, wherein the operations further comprise:
  terminating marketing of the at least one new issue securities offering, either automatically by the computer platform based on preselected criteria or as initiated by the at least one lead agent.

102. The system of claim 92, wherein the operations further comprise:
  providing one or more of the at least one allocation information and/or the one or more final listings as output to the first portal and/or the second portal based on a final list of orders submitted via the broker-dealer portal and/or the lead agent portal.

103. The system of claim 92, wherein the operations further comprise:
  providing one or more of the at least one allocation information and/or the one or more final listings as output to the broker-dealer portal and/or the lead agent portal based on a final list of the accepted orders.

104. The system of claim 92, wherein the operations further comprise:
  transmitting, by the computer platform, during the closing of the at least one new issue securities offering, to respective ones of the one or more broker-dealers having one or more of the accepted orders, the allocation information that is firm-specific to each respective one of the one or more broker-dealers.

105. The system of claim 92, wherein the operations further comprise:
  providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields including two or more of a limit price, a number of shares or bonds or units, an order value, account information, and a timestamp generated for each order by the computer platform.

106. The system of claim 92 wherein, for the associated new issue securities offering, the offering information further comprises a current number of shares or bonds or units associated with the accepted orders, where said accepted orders have a limit price at or higher than the current indicative pricing, and one or more of:
  a current cumulative number of shares or bonds or units associated with the accepted orders per the specific price levels; a current amount of market value of the accepted orders, where said accepted orders have a limit price at or higher than the current indicative pricing; and/or an amount of time remaining until termination of the marketing of the associated new issue securities offering.

107. The system of claim 92, wherein the operations further comprise:
  commencing, subsequent to termination of marketing of one or more of the at least one new issue securities offering, secondary market trading of the one or more of the at least one new issue securities offering.

108. The system of claim 92, wherein the operations further comprise:
  processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

109. The system of claim 92, wherein the operations further comprise:
  establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

110. The system of claim 92, wherein the operations further comprise:
  establishing the clearing price as a market demand and market-derived price, at which at least a minimum threshold of offered shares or bonds or units of the associated new issue securities offering can be sold.

111. The system of claim 92, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

112. The system of claim 1, wherein the operations further comprise:
providing the lead agent portal to one or more lead or managing agents that manage an issuer's offering, act as an advisor and/or act as a marketing agent, wherein the at least one lead agent is one of the one or more lead or managing agents.

113. The system of claim 112, wherein the allocation information generated on the per-order basis is generated based on two or more of: an order price, an order time, an order size, and/or a pro-rata basis.

114. The system of claim 112, wherein the operations further comprise:
receiving, via the broker-dealer portal, the one or more orders communicated directly from the one or more broker-dealers.

115. The system of claim 112, wherein the operations further comprise:
utilizing existing order routing and/or management protocols to transmit, via at least one of the plurality of portals, electronic data regarding new issue securities offering information associated with the one or more new issue securities offerings.

116. The system of claim 112, wherein the operations further comprise:
connecting the at least one processor with at least one existing order routing and management system of at least one of the one or more broker-dealers.

117. The system of claim 112, wherein the operations further comprise:
connecting the at least one processor with one or more of the at least one electronic order routing and management system, such that the computer platform is configured for direct communication with the one or more of the at least one electronic order routing and management system, using existing order routing and/or management protocols, for order submission and for communicating subsequent information regarding status of the accepted orders processed by the computer platform.

118. The system of claim 117, wherein the existing order routing and/or management protocols include Financial Information eXchange protocols (FIX protocols).

119. The system of claim 112, wherein the allocation information is generated for a plurality of the accepted orders giving priority to the accepted orders having timestamps denoting earlier receipt, such that the accepted orders having earlier timestamps are eligible for allocation at a greater percentage (fill rate) or proportion (fill amount) of an order amount than the accepted orders having later timestamps.

120. The system of claim 112, wherein the operations further comprise:
terminating marketing of the at least one new issue securities offering, either automatically by the computer platform based on preselected criteria or as initiated by the at least one lead agent.

121. The system of claim 112, wherein the operations further comprise:
providing one or more of the at least one allocation information and/or the one or more final listings as output to the first portal and/or the second portal based on a final list of orders submitted via the broker-dealer portal and/or the lead agent portal.

122. The system of claim 112, wherein the operations further comprise:
providing one or more of the at least one allocation information and/or the one or more final listings as output to the broker-dealer portal and/or the lead agent portal based on a final list of the accepted orders.

123. The system of claim 112, wherein the operations further comprise:
transmitting, by the computer platform, during the closing of the at least one new issue securities offering, to respective ones of the one or more broker-dealers having one or more of the accepted orders, the allocation information that is firm-specific to each respective one of the one or more broker-dealers.

124. The system of claim 112, wherein the operations further comprise:
providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields including two or more of a limit price, a number of shares or bonds or units, an order value, account information, and a timestamp generated for each order by the computer platform.

125. The system of claim 112 wherein, for the associated new issue securities offering, the offering information further comprises three or more of:
a current number of shares or bonds or units associated with the accepted orders, where said accepted orders have a limit price at or higher than the current indicative pricing; a current cumulative number of shares or bonds or units associated with the accepted orders per the specific price levels; a current number of holders associated with the accepted orders where said accepted orders have a limit price at or higher than the current indicative pricing; a current number of holders associated with the accepted orders per the specific price levels; a current amount of market value of the accepted orders, where said accepted orders have a limit price at or higher than the current indicative pricing; and/or an amount of time remaining until termination of the marketing of the associated new issue securities offering.

126. The system of claim 112, wherein the operations further comprise:
commencing, subsequent to termination of marketing of one or more of the at least one new issue securities offering, secondary market trading of the one or more of the at least one new issue securities offering.

127. The system of claim 112, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

128. The system of claim 112, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

129. The system of claim 112, wherein the operations further comprise:
establishing the clearing price as a market demand and market-derived price, at which at least a minimum threshold of offered shares or bonds or units of the associated new issue securities offering can be sold.

130. The system of claim 112, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

131. The system of claim 1, wherein the allocation information generated on the per-order basis is generated based on one or more of: an order price, an order time, an order size, and/or a pro-rata basis.

132. The system of claim 131, wherein the operations further comprise:
receiving, via the broker-dealer portal, the one or more orders communicated directly from the one or more broker-dealers.

133. The system of claim 131, wherein the operations further comprise:
utilizing existing order routing and/or management protocols to transmit, via at least one of the plurality of portals, electronic data regarding new issue securities offering information associated with the one or more new issue securities offerings.

134. The system of claim 131, wherein the operations further comprise:
connecting the at least one processor with at least one existing order routing and management system of at least one of the one or more broker-dealers.

135. The system of claim 131, wherein the operations further comprise:
connecting the at least one processor with one or more of the at least one electronic order routing and management system, such that the computer platform is configured for direct communication with the one or more of the at least one electronic order routing and management system, using existing order routing and/or management protocols, for order submission and for communicating subsequent information regarding status of the accepted orders processed by the computer platform.

136. The system of claim 135, wherein the existing order routing and/or management protocols include Financial Information eXchange protocols (FIX protocols).

137. The system of claim 131, wherein the allocation information is generated for a plurality of the accepted orders giving priority to the accepted orders having timestamps denoting earlier receipt, such that the accepted orders having earlier timestamps are eligible for allocation at a greater percentage (fill rate) or proportion (fill amount) of an order amount than the accepted orders having later timestamps.

138. The system of claim 131, wherein the operations further comprise:
terminating marketing of the at least one new issue securities offering, either automatically by the computer platform based on preselected criteria or as initiated by the at least one lead agent.

139. The system of claim 131, wherein the operations further comprise:
providing one or more of the at least one allocation information and/or the one or more final listings as output to the first portal and/or the second portal based on a final list of orders submitted via the broker-dealer portal and/or the lead agent portal.

140. The system of claim 131, wherein the operations further comprise:
providing one or more of the at least one allocation information and/or the one or more final listings as output to the broker-dealer portal and/or the lead agent portal based on a final list of the accepted orders.

141. The system of claim 131, wherein the operations further comprise:
transmitting, by the computer platform, during the closing of the at least one new issue securities offering, to respective ones of the one or more broker-dealers having one or more of the accepted orders, the allocation information that is firm-specific to each respective one of the one or more broker-dealers.

142. The system of claim 131, wherein the operations further comprise:
providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields including two or more of a limit price, a number of shares or bonds or units, an order value, account information, and a timestamp generated for each order by the computer platform.

143. The system of claim 131 wherein, for the associated new issue securities offering, the offering information further comprises:
a current number of shares or bonds or units associated with the accepted orders, where said accepted orders have a limit price at or higher than the current indicative pricing; a current amount of market value of the accepted orders, where said accepted orders have a limit price at or higher than the current indicative pricing; and an amount of time remaining until termination of the marketing of the associated new issue securities offering.

144. The system of claim 131, wherein the operations further comprise:
commencing, subsequent to termination of marketing of one or more of the at least one new issue securities offering, secondary market trading of the one or more of the at least one new issue securities offering.

145. The system of claim 131, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

146. The system of claim 131, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

147. The system of claim 131, wherein the operations further comprise:
establishing the clearing price as a market demand and market-derived price, at which at least a minimum threshold of offered shares or bonds or units of the associated new issue securities offering can be sold.

148. The system of claim 131, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

149. The system of claim 1, wherein the operations further comprise:
receiving, via the broker-dealer portal, the one or more orders communicated directly from the one or more broker-dealers.

150. The system of claim 149, wherein the operations further comprise:
utilizing existing order routing and/or management protocols to transmit, via at least one of the plurality of portals, electronic data regarding new issue securities offering information associated with the one or more new issue securities offerings.

151. The system of claim 149, wherein the operations further comprise:
connecting the at least one processor with at least one existing order routing and management system of at least one of the one or more broker-dealers.

152. The system of claim 149, wherein the operations further comprise:
connecting the at least one processor with one or more of the at least one electronic order routing and management system, such that the computer platform is configured for direct communication with the one or more of the at least one electronic order routing and management system, using existing order routing and/or management protocols, for order submission and for communicating subsequent information regarding status of the accepted orders processed by the computer platform.

153. The system of claim 152, wherein the existing order routing and/or management protocols include Financial Information eXchange protocols (FIX protocols).

154. The system of claim 149, wherein the allocation information is generated for a plurality of the accepted orders giving priority to the accepted orders having timestamps denoting earlier receipt, such that the accepted orders having earlier timestamps are eligible for allocation at a greater percentage (fill rate) or proportion (fill amount) of an order amount than the accepted orders having later timestamps.

155. The system of claim 149, wherein the operations further comprise:
terminating marketing of the at least one new issue securities offering, either automatically by the computer platform based on preselected criteria or as initiated by the at least one lead agent.

156. The system of claim 149, wherein the operations further comprise:
providing one or more of the at least one allocation information and/or the one or more final listings as output to the first portal and/or the second portal based on a final list of orders submitted via the broker-dealer portal and/or the lead agent portal.

157. The system of claim 149, wherein the operations further comprise:
providing one or more of the at least one allocation information and/or the one or more final listings as output to the broker-dealer portal and/or the lead agent portal based on a final list of the accepted orders.

158. The system of claim 149, wherein the operations further comprise:
transmitting, by the computer platform, during the closing of the at least one new issue securities offering, to respective ones of the one or more broker-dealers having one or more of the accepted orders, the allocation information that is firm-specific to each respective one of the one or more broker-dealers.

159. The system of claim 149, wherein the operations further comprise:
providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields including two or more of a limit price, a number of shares or bonds or units, an order value, account information, and a timestamp generated for each order by the computer platform.

160. The system of claim 149 wherein, for the associated new issue securities offering, the offering information further comprises one or both of:
a current number of shares or bonds or units associated with the accepted orders, where said accepted orders have a limit price at or higher than the current indicative pricing; and/or a current cumulative number of shares or bonds or units associated with the accepted orders per the specific price levels.

161. The system of claim 149, wherein the operations further comprise:
commencing, subsequent to termination of marketing of one or more of the at least one new issue securities offering, secondary market trading of the one or more of the at least one new issue securities offering.

162. The system of claim 149, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

163. The system of claim 149, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

164. The system of claim 149, wherein the operations further comprise:
establishing the clearing price as a market demand and market-derived price, at which at least a minimum threshold of offered shares or bonds or units of the associated new issue securities offering can be sold.

165. The system of claim 149, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

166. The system of claim 1, wherein the operations further comprise:
utilizing existing order routing and/or management protocols to transmit, via at least one of the plurality of portals, electronic data regarding new issue securities offering information associated with the one or more new issue securities offerings.

167. The system of claim 166, wherein the operations further comprise:
connecting, via a secure communication channel over which confidential information is securely transmitted, the at least one processor with at least one existing order routing and management system of at least one of the one or more broker-dealers.

168. The system of claim 166, wherein the operations further comprise:
connecting the at least one processor with one or more of the at least one electronic order routing and management system, such that the computer platform is configured for direct communication with the one or more of the at least one electronic order routing and management system, using the existing order routing and/or management protocols, for order submission and for communicating subsequent information regarding status of the accepted orders processed by the computer platform.

169. The system of claim 168, wherein the existing order routing and/or management protocols include Financial Information eXchange protocols (FIX protocols).

170. The system of claim 166, wherein the allocation information is generated for a plurality of the accepted orders giving priority to the accepted orders having timestamps denoting earlier receipt, such that the accepted orders having earlier timestamps are eligible for allocation at a greater percentage (fill rate) or proportion (fill amount) of an order amount than the accepted orders having later timestamps.

171. The system of claim 166, wherein the operations further comprise:
terminating marketing of the at least one new issue securities offering, either automatically by the computer platform based on preselected criteria or as initiated by the at least one lead agent.

172. The system of claim 166, wherein the operations further comprise:
providing one or more of the at least one allocation information and/or the one or more final listings as output to the first portal and/or the second portal based on a final list of orders submitted via the broker-dealer portal and/or the lead agent portal.

173. The system of claim 166, wherein the operations further comprise:
providing one or more of the at least one allocation information and/or the one or more final listings as output to the broker-dealer portal and/or the lead agent portal based on a final list of the accepted orders.

174. The system of claim 166, wherein the operations further comprise:
transmitting, by the computer platform, during the closing of the at least one new issue securities offering, to respective ones of the one or more broker-dealers having one or more of the accepted orders, the allocation information that is firm-specific to each respective one of the one or more broker-dealers.

175. The system of claim 166, wherein the operations further comprise:
providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields including two or more of a limit price, a number of shares or bonds or units, an order value, account information, and a timestamp generated for each order by the computer platform.

176. The system of claim 166 wherein, for the associated new issue securities offering, the offering information further comprises one or both of:
a current number of shares or bonds or units associated with the accepted orders, where said accepted orders have a limit price at or higher than the current indicative pricing; and/or a current cumulative number of shares or bonds or units associated with the accepted orders per the specific price levels.

177. The system of claim 166, wherein the operations further comprise:
commencing, subsequent to termination of marketing of one or more of the at least one new issue securities offering, secondary market trading of the one or more of the at least one new issue securities offering.

178. The system of claim 166, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

179. The system of claim 166, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

180. The system of claim 166, wherein the operations further comprise:
establishing the clearing price as a market demand and market-derived price, at which at least a minimum threshold of offered shares or bonds or units of the associated new issue securities offering can be sold.

181. The system of claim 166, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

182. The system of claim 1, wherein the operations further comprise:
connecting the at least one processor with at least one existing order routing and management system of at least one of the one or more broker-dealers.

183. The system of claim 182, wherein the operations further comprise:
connecting the at least one processor with one or more of the at least one electronic order routing and management system, such that the computer platform is configured for direct communication with the one or more of the at least one electronic order routing and management system, using existing order routing and/or management protocols, for order submission and for communicating subsequent information regarding status of the accepted orders processed by the computer platform.

184. The system of claim 183, wherein the existing order routing and/or management protocols include Financial Information eXchange protocols (FIX protocols).

185. The system of claim 182, wherein the allocation information is generated for a plurality of the accepted orders giving priority to the accepted orders having timestamps denoting earlier receipt, such that the accepted orders having earlier timestamps are eligible for allocation at a greater percentage (fill rate) or proportion (fill amount) of an order amount than the accepted orders having later timestamps.

186. The system of claim 182, wherein the operations further comprise:
terminating marketing of the at least one new issue securities offering, either automatically by the computer platform based on preselected criteria or as initiated by the at least one lead agent.

187. The system of claim 182, wherein the operations further comprise:
providing one or more of the at least one allocation information and/or the one or more final listings as output to the first portal and/or the second portal based on a final list of orders submitted via the broker-dealer portal and/or the lead agent portal.

188. The system of claim 182, wherein the operations further comprise:
providing one or more of the at least one allocation information and/or the one or more final listings as output to the broker-dealer portal and/or the lead agent portal based on a final list of the accepted orders.

189. The system of claim 182, wherein the operations further comprise:
transmitting, by the computer platform, during the closing of the at least one new issue securities offering, to respective ones of the one or more broker-dealers having one or more of the accepted orders, the allocation information that is firm-specific to each respective one of the one or more broker-dealers.

190. The system of claim 182, wherein the operations further comprise:
providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields including two or more of a limit price, a number of shares or bonds or units, an order value, account information, and a timestamp generated for each order by the computer platform.

191. The system of claim 182 wherein, for the associated new issue securities offering, the offering information further comprises one or both of:
a current number of shares or bonds or units associated with the accepted orders, where said accepted orders have a limit price at or higher than the current indicative pricing; and/or a current cumulative number of shares or bonds or units associated with the accepted orders per the specific price levels.

192. The system of claim 182, wherein the operations further comprise:
commencing, subsequent to termination of marketing of one or more of the at least one new issue securities offering, secondary market trading of the one or more of the at least one new issue securities offering.

193. The system of claim 182, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

194. The system of claim 182, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

195. The system of claim 182, wherein the operations further comprise:
establishing the clearing price as a market demand and market-derived price, at which at least a minimum threshold of offered shares or bonds or units of the associated new issue securities offering can be sold.

196. The system of claim 182, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

197. The system of claim 1, wherein the operations further comprise:
connecting the at least one processor with one or more of the at least one electronic order routing and management system, such that the computer platform is configured for direct communication with the one or more of the at least one electronic order routing and management system, using existing order routing and/or management protocols, for order submission and for communicating subsequent information regarding status of the accepted orders processed by the computer platform.

198. The system of claim 197, wherein the allocation information is generated for a plurality of the accepted orders giving priority to the accepted orders having timestamps denoting earlier receipt, such that the accepted orders having earlier timestamps are eligible for allocation at a greater percentage (fill rate) or proportion (fill amount) of an order amount than the accepted orders having later timestamps.

199. The system of claim 197, wherein the operations further comprise:
terminating marketing of the at least one new issue securities offering, either automatically by the computer platform based on preselected criteria or as initiated by the at least one lead agent.

200. The system of claim 197, wherein the operations further comprise:
providing one or more of the at least one allocation information and/or the one or more final listings as output to the first portal and/or the second portal based on a final list of orders submitted via the broker-dealer portal and/or the lead agent portal.

201. The system of claim 197, wherein the operations further comprise:
providing one or more of the at least one allocation information and/or the one or more final listings as output to the broker-dealer portal and/or the lead agent portal based on a final list of the accepted orders.

202. The system of claim 197, wherein the operations further comprise:
transmitting, by the computer platform, during the closing of the at least one new issue securities offering, to respective ones of the one or more broker-dealers having one or more of the accepted orders, the allocation information that is firm-specific to each respective one of the one or more broker-dealers.

203. The system of claim 197, wherein the operations further comprise:
providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields including two or more of a limit price, a number of shares or bonds or units, an order value, account information, and a timestamp generated for each order by the computer platform.

204. The system of claim 197 wherein, for the associated new issue securities offering, the offering information further comprises one or both of:
a current number of shares or bonds or units associated with the accepted orders, where said accepted orders have a limit price at or higher than the current indicative pricing; and/or a current cumulative number of shares or bonds or units associated with the accepted orders per the specific price levels.

205. The system of claim 197, wherein the operations further comprise:
commencing, subsequent to termination of marketing of one or more of the at least one new issue securities offering, secondary market trading of the one or more of the at least one new issue securities offering.

206. The system of claim 197, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

207. The system of claim 197, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

208. The system of claim 197, wherein the operations further comprise:
establishing the clearing price as a market demand and market-derived price, at which at least a minimum threshold of offered shares or bonds or units of the associated new issue securities offering can be sold.

209. The system of claim 197, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

210. The system of claim 197, wherein the existing order routing and/or management protocols include Financial Information eXchange protocols (FIX protocols).

211. The system of claim 210, wherein the allocation information is generated for a plurality of the accepted orders giving priority to the accepted orders having timestamps denoting earlier receipt, such that the accepted orders having earlier timestamps are eligible for allocation at a greater percentage (fill rate) or proportion (fill amount) of an order amount than the accepted orders having later timestamps.

212. The system of claim 210, wherein the operations further comprise:
terminating marketing of the at least one new issue securities offering, either automatically by the computer platform based on preselected criteria or as initiated by the at least one lead agent.

213. The system of claim 210, wherein the operations further comprise:
providing one or more of the at least one allocation information and/or the one or more final listings as output to the first portal and/or the second portal based on a final list of orders submitted via the broker-dealer portal and/or the lead agent portal.

214. The system of claim 210, wherein the operations further comprise:
providing one or more of the at least one allocation information and/or the one or more final listings as output to the broker-dealer portal and/or the lead agent portal based on a final list of the accepted orders.

215. The system of claim 210, wherein the operations further comprise:
transmitting, by the computer platform, during the closing of the at least one new issue securities offering, to respective ones of the one or more broker-dealers having one or more of the accepted orders, the allocation information that is firm-specific to each respective one of the one or more broker-dealers.

216. The system of claim 210, wherein the operations further comprise:
providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields including two or more of a limit price, a number of shares or bonds or units, an order value, account information, and a timestamp generated for each order by the computer platform.

217. The system of claim 210 wherein, for the associated new issue securities offering, the offering information further comprises one or both of:
a current number of shares or bonds or units associated with the accepted orders, where said accepted orders have a limit price at or higher than the current indicative pricing; and/or a current cumulative number of shares or bonds or units associated with the accepted orders per the specific price levels.

218. The system of claim 210, wherein the operations further comprise:
commencing, subsequent to termination of marketing of one or more of the at least one new issue securities offering, secondary market trading of the one or more of the at least one new issue securities offering.

219. The system of claim 210, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

220. The system of claim 210, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

221. The system of claim 210, wherein the operations further comprise:
establishing the clearing price as a market demand and market-derived price, at which at least a minimum threshold of offered shares or bonds or units of the associated new issue securities offering can be sold.

222. The system of claim 210, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

223. The system of claim 1, wherein the allocation information is generated for a plurality of the accepted orders giving priority to the accepted orders having timestamps denoting earlier receipt, such that the accepted orders having earlier timestamps are eligible for allocation at a greater percentage (fill rate) or proportion (fill amount) of an order amount than the accepted orders having later timestamps.

224. The system of claim 223, wherein for the accepted orders that are modified, by the computer platform, upon receipt and acceptance of respective corresponding amending orders, the computer platform automatically updates timestamp information of the accepted orders that are modified.

225. The system of claim 223, wherein the operations further comprise:
terminating marketing of the at least one new issue securities offering, either automatically by the computer platform based on preselected criteria or as initiated by the at least one lead agent.

226. The system of claim 223, wherein the operations further comprise:
providing one or more of the at least one allocation information and/or the one or more final listings as output to the first portal and/or the second portal based on a final list of orders submitted via the broker-dealer portal and/or the lead agent portal.

227. The system of claim 223, wherein the operations further comprise:
providing one or more of the at least one allocation information and/or the one or more final listings as output to the broker-dealer portal and/or the lead agent portal based on a final list of the accepted orders.

228. The system of claim 223, wherein the operations further comprise:
transmitting, by the computer platform, during the closing of the at least one new issue securities offering, to respective ones of the one or more broker-dealers having one or more of the accepted orders, the allocation information that is firm-specific to each respective one of the one or more broker-dealers.

229. The system of claim 223, wherein the operations further comprise:
providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields including two or more of a limit price, a number of shares or bonds or units, an order value, account information, and a timestamp generated for each order by the computer platform.

230. The system of claim 223 wherein, for the associated new issue securities offering, the offering information further comprises one or both of:
a current number of shares or bonds or units associated with the accepted orders, where said accepted orders have a limit price at or higher than the current indicative pricing; and/or a current cumulative number of shares or bonds or units associated with the accepted orders per the specific price levels.

231. The system of claim 223, wherein the operations further comprise:
commencing, subsequent to termination of marketing of one or more of the at least one new issue securities offering, secondary market trading of the one or more of the at least one new issue securities offering.

232. The system of claim 223, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

233. The system of claim 223, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

234. The system of claim 223, wherein the operations further comprise:
establishing the clearing price as a market demand and market-derived price, at which at least a minimum threshold of offered shares or bonds or units of the associated new issue securities offering can be sold.

235. The system of claim 223, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

236. The system of claim 1, wherein the operations further comprise:
terminating marketing of the at least one new issue securities offering, either automatically by the computer platform based on preselected criteria or as initiated by the at least one lead agent.

237. The system of claim 236, wherein the operations further comprise:
providing one or more of the at least one allocation information and/or the one or more final listings as output to the first portal and/or the second portal based on a final list of orders submitted via the broker-dealer portal and/or the lead agent portal.

238. The system of claim 236, wherein the operations further comprise:
providing one or more of the at least one allocation information and/or the one or more final listings as output to the broker-dealer portal and/or the lead agent portal based on a final list of the accepted orders.

239. The system of claim 236, wherein the operations further comprise:
transmitting, by the computer platform, during the closing of the at least one new issue securities offering, to respective ones of the one or more broker-dealers having one or more of the accepted orders, the allocation information that is firm-specific to each respective one of the one or more broker-dealers.

240. The system of claim 236, wherein the operations further comprise:
providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields including two or more of a limit price, a number of shares or bonds or units, an order value, account information, and a time-stamp generated for each order by the computer platform.

241. The system of claim 236 wherein, for the associated new issue securities offering, the offering information further comprises one or both of:
a current number of shares or bonds or units associated with the accepted orders, where said accepted orders have a limit price at or higher than the current indicative pricing; and/or a current cumulative number of shares or bonds or units associated with the accepted orders per the specific price levels.

242. The system of claim 236, wherein the operations further comprise:
commencing, subsequent to termination of marketing of one or more of the at least one new issue securities offering, secondary market trading of the one or more of the at least one new issue securities offering.

243. The system of claim 236, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

244. The system of claim 236, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

245. The system of claim 236, wherein the operations further comprise:
establishing the clearing price as a market demand and market-derived price, at which at least a minimum threshold of offered shares or bonds or units of the associated new issue securities offering can be sold.

246. The system of claim 236, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

247. The system of claim 1, wherein the operations further comprise:
providing one or more of the at least one allocation information and/or the one or more final listings as output to the first portal and/or the second portal based on a final list of orders submitted via the broker-dealer portal and/or the lead agent portal.

248. The system of claim 247, wherein the operations further comprise:
providing the one or more of the at least one allocation information and/or the one or more final listings as output to the broker-dealer portal and/or the lead agent portal based on the final list of orders submitted on behalf of the one or more investors.

249. The system of claim 247, wherein the operations further comprise:
transmitting, by the computer platform, during the closing of the at least one new issue securities offering, to respective ones of the one or more broker-dealers having one or more of the accepted orders, the allocation information that is firm-specific to each respective one of the one or more broker-dealers.

250. The system of claim 247, wherein the operations further comprise:
providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields including two or more of a limit price, a number of shares or bonds or units, an order value, account information, and a timestamp generated for each order by the computer platform.

251. The system of claim 247 wherein, for the associated new issue securities offering, the offering information further comprises one or both of:
a current number of shares or bonds or units associated with the accepted orders, where said accepted orders have a limit price at or higher than the current indicative pricing; and/or a current cumulative number of shares or bonds or units associated with the accepted orders per the specific price levels.

252. The system of claim 247, wherein the operations further comprise:
commencing, subsequent to termination of marketing of one or more of the at least one new issue securities offering, secondary market trading of the one or more of the at least one new issue securities offering.

253. The system of claim 247, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

254. The system of claim 247, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

255. The system of claim 247, wherein the operations further comprise:
establishing the clearing price as a market demand and market-derived price, at which at least a minimum threshold of offered shares or bonds or units of the associated new issue securities offering can be sold.

256. The system of claim 247, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

257. The system of claim 1, wherein the operations further comprise:
providing one or more of the at least one allocation information and/or the one or more final listings as output to the broker-dealer portal and/or the lead agent portal based on a final list of the accepted orders.

258. The system of claim 257, wherein the operations further comprise:
generating, as an output of the computer platform, an indication of an amount of cash proceeds obligated to be delivered to an issuer of the at least one new issue securities offering during settlement.

259. The system of claim 257, wherein the operations further comprise:
transmitting, by the computer platform, during the closing of the at least one new issue securities offering, to respective ones of the one or more broker-dealers having one or more of the accepted orders, the allocation information that is firm-specific to each respective one of the one or more broker-dealers.

260. The system of claim 257, wherein the operations further comprise:
providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields including two or more of a limit price, a number of shares or bonds or units, an order value, account information, and a timestamp generated for each order by the computer platform.

261. The system of claim 257 wherein, for the associated new issue securities offering, the offering information further comprises one or both of:
a current number of shares or bonds or units associated with the accepted orders, where said accepted orders have a limit price at or higher than the current indicative pricing; and/or a current cumulative number of shares or bonds or units associated with the accepted orders per the specific price levels.

262. The system of claim 257, wherein the operations further comprise:
commencing, subsequent to termination of marketing of one or more of the at least one new issue securities offering, secondary market trading of the one or more of the at least one new issue securities offering.

263. The system of claim 257, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

264. The system of claim 257, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

265. The system of claim 257, wherein the operations further comprise:
establishing the clearing price as a market demand and market-derived price, at which at least a minimum threshold of offered shares or bonds or units of the associated new issue securities offering can be sold.

266. The system of claim 257, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

267. The system of claim 1, wherein the operations further comprise:
transmitting, by the computer platform, during the closing of the at least one new issue securities offering, to respective ones of the one or more broker-dealers having one or more of the accepted orders, the allocation information that is firm-specific to each respective one of the one or more broker-dealers.

268. The system of claim 267, wherein the operations further comprise:
generating, by the computer platform, the allocation information to be firm-specific, wherein the allocation information further comprises investor order information, based upon the accepted orders submitted by each of the respective ones, indicating to which investor, associated with the respective ones, each allocation of the allocation information is to be distributed.

269. The system of claim 267, wherein the operations further comprise:
providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields including two or more of a limit price, a number of shares or bonds or units, an order value, account information, and a timestamp generated for each order by the computer platform.

270. The system of claim 267 wherein, for the associated new issue securities offering, the offering information further comprises one or both of:
a current number of shares or bonds or units associated with the accepted orders, where said accepted orders have a limit price at or higher than the current indicative pricing; and/or a current cumulative number of shares or bonds or units associated with the accepted orders per the specific price levels.

271. The system of claim 267, wherein the operations further comprise:
commencing, subsequent to termination of marketing of one or more of the at least one new issue securities offering, secondary market trading of the one or more of the at least one new issue securities offering.

272. The system of claim 267, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

273. The system of claim 267, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

274. The system of claim 267, wherein the operations further comprise:
establishing the clearing price as a market demand and market-derived price, at which at least a minimum threshold of offered shares or bonds or units of the associated new issue securities offering can be sold.

275. The system of claim 267, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

276. The system of claim 1, wherein the operations further comprise:
providing the broker-dealer portal to the one or more broker-dealers during the marketing of the one or more new issue securities offerings and the closing of the one or more new issue securities offerings, wherein the broker-dealer portal further comprises a table of orders, wherein, for each order in the table of orders, the table of orders further comprises data fields including two or more of a limit price, a number of shares or bonds or units, an order value, account information, and a timestamp generated for each order by the computer platform.

277. The system of claim 276 wherein, for the associated new issue securities offering, the offering information further comprises one or both of:
a current number of shares or bonds or units associated with the accepted orders, where said accepted orders have a limit price at or higher than the current indicative pricing; and/or a current cumulative number of shares or bonds or units associated with the accepted orders per the specific price levels.

278. The system of claim 276, wherein the operations further comprise:
commencing, subsequent to termination of marketing of one or more of the at least one new issue securities offering, secondary market trading of the one or more of the at least one new issue securities offering.

279. The system of claim 276, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

280. The system of claim 276, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

281. The system of claim 276, wherein the operations further comprise:
establishing the clearing price as a market demand and market-derived price, at which at least a minimum threshold of offered shares or bonds or units of the associated new issue securities offering can be sold.

282. The system of claim 276, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

283. The system of claim 1 wherein, for the associated new issue securities offering, the offering information further comprises one or both of:
a current number of shares or bonds or units associated with the accepted orders, where said accepted orders have a limit price at or higher than the current indicative pricing; and/or a current cumulative number of shares or bonds or units associated with the accepted orders per the specific price levels.

284. The system of claim 283, wherein the operations further comprise:
commencing, subsequent to termination of marketing of one or more of the at least one new issue securities offering, secondary market trading of the one or more of the at least one new issue securities offering.

285. The system of claim 283, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

286. The system of claim 283, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

287. The system of claim 283, wherein the operations further comprise:
establishing the clearing price as a market demand and market-derived price, at which at least a minimum threshold of offered shares or bonds or units of the associated new issue securities offering can be sold.

288. The system of claim 283, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

289. The system of claim 1, wherein the operations further comprise:
commencing, subsequent to termination of marketing of one or more of the at least one new issue securities offering, secondary market trading of the one or more of the at least one new issue securities offering.

290. The system of claim 289, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

291. The system of claim 289, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

292. The system of claim 289, wherein the operations further comprise:
establishing the clearing price as a market demand and market-derived price, at which at least a minimum threshold of offered shares or bonds or units of the associated new issue securities offering can be sold.

293. The system of claim 289, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

294. The system of claim 1, wherein the operations further comprise:
processing secondary securities, comprised of all or part of at least one first investor's existing investment holdings, related to the one or more new issue securities offerings and submitted through the first portal and/or the second portal to offer to other investors along with the one or more new issue securities offerings, such that the one or more new issue securities offerings thereby include the secondary securities.

295. The system of claim 294, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

296. The system of claim 294, wherein the operations further comprise:
establishing the clearing price as a market demand and market-derived price, at which at least a minimum threshold of offered shares or bonds or units of the associated new issue securities offering can be sold.

297. The system of claim 294, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

298. The system of claim 1, wherein the operations further comprise:
establishing the current indicative pricing as an indicative clearing price, wherein the indicative clearing price is one price level, of the specific price levels, at which at least a minimum threshold of offered shares or bonds or units of the associated new issue securities offering can be sold at time of establishing the indicative clearing price.

299. The system of claim 298, wherein the operations further comprise:
establishing the clearing price as a market demand and market-derived price, at which at least a minimum threshold of offered shares or bonds or units of the associated new issue securities offering can be sold.

300. The system of claim 298, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

301. The system of claim 1, wherein the operations further comprise:
establishing the clearing price as a market demand and market-derived price, at which at least a minimum threshold of offered shares or bonds or units of the associated new issue securities offering can be sold.

302. The system of claim 301, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

303. The system of claim 1, wherein at least one of the accepted orders is a good-until-canceled order eligible for further processing by the computer platform unless the computer platform receives and accepts a cancellation order associated with the good-until-canceled order, wherein the cancellation order is rejected as not acceptable, by the computer platform, if the cancellation order is not received prior to a deadline for submitting the cancellation order.

304. The system of claim 1, wherein the operations further comprise:
publishing, prior to termination of the marketing of the associated new issue securities offering, one or more pre-closing notices.

305. The system of claim 1, wherein the operations further comprise:
publishing, via the computer platform, a notice informing the one or more broker-dealers and/or the general public that the marketing of the at least one new issue securities offering has ended.

306. The system of claim 1, wherein the operations further comprise:
conducting, by the computer platform, the one or more new issue securities offerings via only processing transactions from participants that submit their orders through the one or more broker-dealers and/or the at least one lead agent, to thereby preserve, for the participants, investor protection benefits that are part of an existing, regulated industry in which the one or more broker-dealers and/or the at least one lead agent are regulated representatives.

307. The system of claim 1, wherein the operations further comprise:
determining that at least one of the one or more orders is disruptive, manipulative or unreliable; and/or
excluding, by the computer platform, one or more of the one or more orders determined to be disruptive, manipulative or unreliable.

308. The system of claim 1, wherein the operations further comprise:
disseminating at least one of (i) a minimum offering metrics at or below which the associated new issue securities offering will not be completed, and/or (ii) a maximum offering metrics above which the associated new issue securities offering will not be increased.

309. The system of claim 308, wherein the operations further comprise:
disseminating the at least one of the minimum offering metrics and/or the maximum offering metrics based on at least one of: a number of holders, an offering price value, an amount of securities to be issued, an amount of assets collected, and/or an amount of cash proceeds realized by an issuing entity.

310. The system of claim 1, wherein the operations further comprise:
comparing, prior to acceptance, each of the one or more orders against an amount, size, condition, and/or requirement established as a threshold by the at least one lead agent; and
rejecting any of the each of the one or more orders that fail to meet the threshold, as not acceptable for further processing by the computer platform.

311. The system of claim 310, wherein the threshold comprises a maximum amount of the one or more orders' size.

312. The system of claim 1, wherein at least one order received at the computer platform from the at least one electronic order routing and management system includes one or more identifiers containing origination data.

313. The system of claim 1, wherein the UI information depicting demand further includes an order depth table and/or an order depth graph.

314. The system of claim 1, wherein the operations further comprise:
providing a second graphical user interface to at least one computer associated with the one or more broker-dealers.

315. The system of claim 314, wherein the second graphical user interface further comprises a user interface button, selection of which suspends one or more orders associated with a financial advisor, suspends one or more orders associated with a particular offering, or suspends all orders associated with a particular offering.

316. The system of claim 1, wherein the operations further comprise:
providing, by the computer platform, information to the one or more broker-dealers, the one or more investors and/or the general public via one or more media outlets and/or financial websites such that the one or more broker-dealers, the one or more investors and/or the general public that already use said one or more media outlets and/or financial websites can also use said one or more media outlets and/or financial websites to attain the offering information.

317. The system of claim 316, wherein the operations further comprise:
providing, by the computer platform, information to the general public, via the one or more media outlets and/or financial websites, wherein the information to the general public further includes one or more of: (a) a total number of bids and amount of securities that were bid for at each price level, (b) a total number of bids and amount of securities bid for at or above the offering price, and/or (c) a number of originating broker-dealers.

318. The system of claim 1, wherein the operations further comprise:
processing orders received from at least one of the one or more broker-dealers and/or the at least one lead agent, submitted for a broker-dealer's and/or a lead agent's own account, as principal orders of the one or more orders, wherein the principal orders include an identifier marking the principal orders as principal.

319. The system of claim 1, wherein the one or more orders are comprised of two or more of: at least one new order, at least one order amendment, and/or at least one order cancellation.

320. The system of claim 1, wherein the first portal is a secure electronic portal that allows the one or more broker-dealers to access its respective data and information securely.

321. The system of claim 1, wherein the second portal is a secure electronic portal that allows the at least one lead agent to access its respective data and information securely.

322. The system of claim 1, wherein the operations further comprise three or more of:
(i) providing equal access to the offering information to participating investors, via the informational portal, on a real-time basis, during the marketing of the one or more new issue securities offerings;
(ii) providing, to the participating investors via the one or more broker-dealers, equal opportunity to place, amend and/or cancel each of the participating investors' own orders of the one or more orders;
(iii) providing the allocation information on a non-partisan (equal) basis based on one or more of order price, order time, order size and/or pro-rata; and/or
(iv) providing the broker-dealer portal and the lead agent portal as secure communication channels over which confidential information is securely transmitted and/or accessed, respectively, via the at least one electronic order routing and management system associated with one or more broker-dealers and via the at least one computer associated with the at least one lead agent;
such that the participating investors are thereby involved in the one or more new issue securities offerings in a manner wherein equal access to all of the participating investors as well as fair, transparent and open participation and distribution of allocations, of the at least one new issue securities offering are achieved.

323. The system of claim 1, wherein the operations further comprise three or more of:
(i) providing, on a real-time basis via the broker-dealer portal, equal access among the one or more broker-dealers to engage in brokering of the one or more new issue securities offerings;
(ii) providing the broker-dealer portal to subscribing ones of the one or more broker-dealers, such that respective investors of subscribing ones of the one or more broker-dealers are provided equal access, to the one or more new issue securities offerings, as all other investors of the subscribing ones, and thereby enabling participation in the one or more new issue securities offerings in a manner that is non-partisan and non-bundled;
(iii) configuring the computer platform to allow the subscribing ones to maintain, with the respective investors of theirs, direct relationships, in which the computer platform will not interfere, and thereby maintain suitability, appropriateness and other investor protection; and/or
(iv) transmitting information including allocations, of the at least one new issue securities offering based upon orders accepted from each of participating investors, and associated investor distributions from the computer platform by a secure channel to each respective one of the subscribing ones for distribution to the participating investors to yield transparent, non-partisan new issue pricing, allocation and distribution;
such that the subscribing ones are involved in the one or more new issue securities offerings in a manner that affords equal access to all of the subscribing ones and respective investor clients of the subscribing ones, such that fair, transparent and open offerings are thereby provided in a non-partisan manner to all of the respective investor clients.

324. The system of claim 1, wherein the operations further comprise:
(i) providing, on a real-time basis via the broker-dealer portal, equal access among the one or more broker-dealers to engage in brokering of the one or more new issue securities offerings;
(ii) providing the broker-dealer portal to subscribing ones of the one or more broker-dealers, such that respective investors of subscribing ones of the one or more broker-dealers are provided equal access, to the one or more new issue securities offerings, as all other investors of the subscribing ones, and thereby enabling participation in the one or more new issue securities offerings in a manner that is non-partisan and non-bundled;
(iii) configuring the computer platform to allow the subscribing ones to maintain, with the respective investors of theirs, direct relationships, in which the computer platform will not interfere, and thereby maintain suitability, appropriateness and other investor protection; and/or
(iv) transmitting information including allocations, of the at least one new issue securities offering based upon orders accepted from each of participating investors, and associated investor distributions from the computer platform by a secure channel to each respective one of the subscribing ones for distribution to the participating investors to yield transparent, non-partisan new issue pricing, allocation and distribution;
such that the subscribing ones are involved in the one or more new issue securities offerings in a manner that affords equal access to all of the subscribing ones and respective investor clients of the subscribing ones, such that fair, transparent and open offerings are thereby provided in a non-partisan manner to all of the respective investor clients.

325. The system as in any one of claims 2, 26, 49, 71, 92, 112, 131, 149, 166, 182, 197, 210, 223, 236, 257, 267, 276, 283, 289, 294, 298, 301, 303, 304, 308, 312 and 316, wherein the operations further comprise one or more of:
- (i) providing equal access to the offering information to participating investors, via the informational portal, on a real-time basis, during the marketing of the one or more new issue securities offerings;
- (ii) providing, to the participating investors via the one or more broker-dealers, equal opportunity to place, amend and/or cancel each of the participating investors' own orders of the one or more orders;
- (iii) providing the allocation information on a non-partisan (equal) basis based on one or more of order price, order time, order size and/or pro-rata; and/or
- (iv) providing the broker-dealer portal and the lead agent portal as secure communication channels over which confidential information is securely transmitted and/or accessed, respectively, via the at least one electronic order routing and management system associated with one or more broker-dealers and via the at least one computer associated with the at least one lead agent;

such that the participating investors are thereby involved in the one or more new issue securities offerings in a manner wherein equal access to all of the participating investors as well as fair, transparent and open participation and distribution of allocations, of the at least one new issue securities offering are achieved.

326. The system as in any one of claims 2, 26, 49, 71, 92, 112, 131, 149, 166, 182, 197, 210, 223, 236, 257, 267, 276, 283, 289, 294, 298, 301, 303, 304, 308, 312 and 316, wherein the operations further comprise two or more of:
- (i) providing, on a real-time basis via the broker-dealer portal, equal access among the one or more broker-dealers to engage in brokering of the one or more new issue securities offerings;
- (ii) providing the broker-dealer portal to subscribing ones of the one or more broker-dealers, such that respective investors of subscribing ones of the one or more broker-dealers are provided equal access, to the one or more new issue securities offerings, as all other investors of the subscribing ones, and thereby enabling participation in the one or more new issue securities offerings in a manner that is non-partisan and non-bundled;
- (iii) configuring the computer platform to allow the subscribing ones to maintain, with the respective investors of theirs, direct relationships, in which the computer platform will not interfere, and thereby maintain suitability, appropriateness and other investor protection; and/or
- (iv) transmitting information including allocations, of the at least one new issue securities offering based upon orders accepted from each of participating investors, and associated investor distributions from the computer platform by a secure channel to each respective one of the subscribing ones for distribution to the participating investors to yield transparent, non-partisan new issue pricing, allocation and distribution;

such that the subscribing ones are involved in the one or more new issue securities offerings in a manner that affords equal access to all of the subscribing ones and respective investor clients of the subscribing ones, such that fair, transparent and open offerings are thereby provided in a non-partisan manner to all of the respective investor clients.

327. The system as in any one of claims 112, 131 and 210 to 222, wherein the operations further comprise three or more of:
- (i) providing, on a real-time basis via the broker-dealer portal, equal access among the one or more broker-dealers to engage in brokering of the one or more new issue securities offerings;
- (ii) providing the broker-dealer portal to subscribing ones of the one or more broker-dealers, such that respective investors of subscribing ones of the one or more broker-dealers are provided equal access, to the one or more new issue securities offerings, as all other investors of the subscribing ones, and thereby enabling participation in the one or more new issue securities offerings in a manner that is non-partisan and non-bundled;
- (iii) configuring the computer platform to allow the subscribing ones to maintain, with the respective investors of theirs, direct relationships, in which the computer platform will not interfere, and thereby maintain suitability, appropriateness and other investor protection; and/or
- (iv) transmitting information including allocations, of the at least one new issue securities offering based upon orders accepted from each of participating investors, and associated investor distributions from the computer platform by a secure channel to each respective one of the subscribing ones for distribution to the participating investors to yield transparent, non-partisan new issue pricing, allocation and distribution;

such that the subscribing ones are involved in the one or more new issue securities offerings in a manner that affords equal access to all of the subscribing ones and respective investor clients of the subscribing ones, such that fair, transparent and open offerings are thereby provided in a non-partisan manner to all of the respective investor clients.

328. The system as in any one of claims 1, 2, 26, 49, 71, 92, 112, 131, 149, 166, 182, 197, 210, 223, 236, 257, 267, 276, 283, 289, 294, 298, 301, 303, 304, 308, 312, 313, 316, 322, 323 and 324, wherein the operations further comprise establishing levels of investor interest and/or non-partisan pricing for the one or more new issue securities offerings by:
- providing, via the broker-dealer portal, during the marketing of the one or more new issue securities offerings, equal access to offerings and information to the one or more broker-dealers; and
- providing, via the informational portal, during the marketing of the one or more new issue securities offerings, equal access to offerings and information to entities accessing the informational portal.

329. The system of claim 328, wherein establishing the levels of investor interest and/or non-partisan pricing for the one or more new issue securities offerings further includes:
- establishing, via the first portal, a communication channel between the computer platform and the one or more broker-dealers, wherein the communication channel uses protocols that connect broker-dealers to existing stock exchanges for secondary market trading orders to also provide for participation in new issue offerings, to thereby expand infrastructure used for secondary market trading orders to further include distribution of the one or more new issue securities offerings.

330. The system of claim 329, wherein establishing the levels of investor interest and/or non-partisan pricing for the one or more new issue securities offerings further includes:
continually publishing, on a real time basis, updates of the current indicative pricing via the one or more of the plurality of portals, to thereby provide price discovery information equally to the one or more broker-dealers, the one or more investors and the general public.

331. The system of claim 330, wherein the operations further comprise:
generating the allocation information on a non-partisan (equal) basis based on one or more of order price, order time, order size, and/or pro-rata.

332. The system of claim 329, wherein the operations further comprise:
generating the allocation information on a non-partisan (equal) basis based on one or more of order price, order time, order size, and/or pro-rata.

333. The system of claim 328, wherein the operations further comprise:
generating the allocation information on a non-partisan (equal) basis based on one or more of order price, order time, order size, and/or pro-rata.

334. The system of claim 328, wherein establishing the levels of investor interest and/or non-partisan pricing for the one or more new issue securities offerings further includes:
continually publishing, on a real time basis, updates of the current indicative pricing via the one or more of the plurality of portals, to thereby provide price discovery information equally to the one or more broker-dealers, the one or more investors and the general public.

335. The system of claim 334, wherein the operations further comprise:
generating the allocation information on a non-partisan (equal) basis based on one or more of order price, order time, order size, and/or pro-rata.

336. The system as in any one of claim 1, wherein the operations further comprise:
processing, by the computer platform, individually/without bundling, investor orders received from one or more of the at least one computer associated with at least one lead agent via the plurality of portals, such that the one or more orders include the investor orders and thereby, as a function of the one or more orders being processed individually including generating the allocation information on the per-order basis, the computer platform provides equal access to the one or more new issue securities offerings to the one or more investors.

337. The system as in any one of claims 1, 25, 304, 308, 312, 313, 316, 322, 323 and 324, wherein the computer platform and one or more computers acting as a lead agent are operated by a same entity, such that the computer platform and the lead agent are not operated by distinct business entities.

338. The system of claim 337, wherein the operations further comprise:
establish the offering price as an attractive/discounted price off of the clearing price, by either receiving the offering price from the at least one lead agent or as automatically determined by the computer platform.

339. The system of claim 337, wherein the one or more orders comprise new orders, order amendments and order cancellations.

340. The system as in any one of claims 1, 2, 26, 49, 71, 91, 304, 308, 312, 313, 316, 322, 323 and 324, wherein the one or more orders received via the plurality of portals for processing, individually/without bundling, by the computer platform include orders received from the one or more broker-dealers and/or the at least one lead agent;
wherein the operations further comprise:
processing orders individually by the computer platform, such that, as a function of the computer platform processing orders individually including generating the allocation information on the per-order basis, the computer platform provides equal access to the one or more new issue securities offerings to the one or more investors.

341. The system of claim 340, wherein the computer platform and one or more computers acting as a lead agent are operated by a same entity, such that the computer platform and the lead agent are not operated by distinct business entities.

342. The system of claim 341, wherein the operations further comprise:
establish the offering price as an attractive/discounted price off of the clearing price, by either receiving the offering price from the at least one lead agent or as automatically determined by the computer platform.

343. The system of claim 340, wherein the operations further comprise:
establish the offering price as an attractive/discounted price off of the clearing price, by either receiving the offering price from the at least one lead agent or as automatically determined by the computer platform.

344. The system of claim 340, wherein the one or more orders comprise new orders, order amendments and order cancellations.

345. The system as in any one of claims 1, 2, 26, 49, 71, 92, 111, 304, 308, 312, 313, 316, 322, 323, 324 and 336, wherein the operations further comprise:
establishing the offering price as an attractive/discounted price off of the clearing price, by either receiving the offering price from the at least one lead agent or as automatically determined by the computer platform.

* * * * *